United States Patent
Wexler et al.

(10) Patent No.: US 9,234,381 B2
(45) Date of Patent: Jan. 12, 2016

(54) SUPPLEMENTAL WINDOW FOR FENESTRATION

(71) Applicant: WexEnergy LLC, Rochester, NY (US)

(72) Inventors: Ronald Myron Wexler, Rochester, NY (US); Alan Scott Metelsky, Rochester, NY (US)

(73) Assignee: WexEnergy LLC, Rochester, NY (US)

( * ) Notice: Subject to any disclaimer, the term of this patent is extended or adjusted under 35 U.S.C. 154(b) by 0 days.

(21) Appl. No.: 14/315,503

(22) Filed: Jun. 26, 2014

(65) Prior Publication Data

US 2014/0331578 A1    Nov. 13, 2014

Related U.S. Application Data

(63) Continuation-in-part of application No. 13/735,449, filed on Jan. 7, 2013, now Pat. No. 8,923,650.

(51) Int. Cl.
*E06B 3/28* (2006.01)
*B60J 1/00* (2006.01)
*E06B 9/00* (2006.01)

(52) U.S. Cl.
CPC . *E06B 3/28* (2013.01); *B60J 1/002* (2013.01); *E06B 2009/005* (2013.01)

(58) Field of Classification Search
CPC ...... B60J 1/002; E06B 2009/005; E06B 3/28; E06B 3/285
USPC ........................................ 52/202, 203, 204.62
See application file for complete search history.

(56) References Cited

U.S. PATENT DOCUMENTS

| | | | | |
|---|---|---|---|---|
| 1,630,208 A | * | 5/1927 | Theodore | 52/203 |
| 1,635,906 A | * | 7/1927 | Reed | 52/203 |
| 1,636,879 A | * | 7/1927 | Tichota | 52/203 |
| 1,679,802 A | * | 8/1928 | Allerheiligen et al. | 52/203 |
| 1,681,443 A | * | 8/1928 | Steinman | 52/203 |
| 1,694,676 A | * | 12/1928 | Will | 52/203 |
| 1,694,677 A | * | 12/1928 | Will | 52/203 |
| 1,753,618 A | * | 4/1930 | Norbeck | 52/203 |
| RE17,821 E | * | 10/1930 | Steinman | 52/203 |
| 1,783,861 A | * | 12/1930 | Thiem | 52/203 |
| 1,799,445 A | * | 4/1931 | Stansberry | 52/203 |
| 3,553,913 A | * | 1/1971 | Eisenberg | 52/172 |

(Continued)

FOREIGN PATENT DOCUMENTS

| | | |
|---|---|---|
| WO | WO2012/078249 | 6/2012 |
| WO | WO2014/123936 | 8/2014 |

(Continued)

*Primary Examiner* — Andrew J Triggs
(74) *Attorney, Agent, or Firm* — Howard Zaretsky; Zaretsky Patent Group PC

(57) ABSTRACT

A supplemental window for fenestration suitable for use with existing windows. The supplemental window, in one embodiment, comprises a frame with plastic sheet material stretched across it. An attachment mechanism secured to the frame functions to fasten the supplemental window to an existing window. The attachment mechanism can be a suction cup or adhesive for example. A seal attached to the frame functions to trap a volume of air between the window pane and the plastic sheet material. An aesthetic covering and draft inhibiting mechanism are also provided. The supplemental window is configured such that the layer of trapped air is of an optimum thickness of 0.15 to 0.75 inches to maximize thermal insulation properties of the supplemental window.

34 Claims, 19 Drawing Sheets

(56) References Cited

U.S. PATENT DOCUMENTS

| | | |
|---|---|---|
| 3,936,670 A | 2/1976 | Allen, Sr. |
| 3,978,612 A | 9/1976 | Young |
| 4,056,229 A | 11/1977 | Jones |
| 4,085,238 A | 4/1978 | Chenel et al. |
| 4,085,999 A | 4/1978 | Chahroudi |
| 4,132,035 A | 1/1979 | Frambach |
| 4,158,278 A | 6/1979 | Cardinale et al. |
| 4,182,088 A | 1/1980 | Ball |
| 4,206,615 A | 6/1980 | Sobajima et al. |
| 4,257,419 A | 3/1981 | Goltner et al. |
| 4,272,934 A | 6/1981 | Cowden et al. |
| 4,292,773 A | 10/1981 | Laing et al. |
| 4,295,920 A | 10/1981 | Bovone |
| 4,351,137 A | 9/1982 | Enyart et al. |
| 4,361,116 A | 11/1982 | Kilham |
| 4,372,094 A | 2/1983 | Boschetti |
| 4,382,588 A | 5/1983 | Vovk et al. |
| 4,387,542 A | 6/1983 | Wehr |
| 4,406,246 A * | 9/1983 | DeMeyer et al. ............. 118/505 |
| 4,422,492 A | 12/1983 | Bledsoe |
| 4,424,653 A | 1/1984 | Heinen |
| 4,456,241 A | 6/1984 | Newsome |
| 4,463,942 A | 8/1984 | Newsome |
| 4,471,589 A | 9/1984 | Schmidlin |
| 4,473,980 A | 10/1984 | Foster |
| 4,492,355 A | 1/1985 | Bylin |
| 4,499,703 A * | 2/1985 | Rundo .......................... 52/746.1 |
| 4,539,516 A | 9/1985 | Thompson |
| 4,544,587 A * | 10/1985 | Nesbitt ............................ 428/34 |
| 4,561,223 A | 12/1985 | Gold |
| 4,588,153 A | 5/1986 | Boston et al. |
| 4,590,883 A | 5/1986 | Steed et al. |
| 4,598,520 A | 7/1986 | Ellstrom |
| 4,624,539 A | 11/1986 | King et al. |
| 4,648,572 A | 3/1987 | Sokol |
| 4,694,973 A | 9/1987 | Rose et al. |
| 4,702,051 A | 10/1987 | Miller |
| 4,733,956 A | 3/1988 | Erickson |
| 4,736,539 A | 4/1988 | Dickinson |
| 4,841,696 A | 6/1989 | Miller |
| 4,842,322 A | 6/1989 | Lu |
| 4,846,429 A | 7/1989 | Scheurer |
| 4,848,913 A | 7/1989 | Greiner |
| D304,737 S | 11/1989 | Mori |
| 4,896,855 A | 1/1990 | Furnish |
| 4,905,569 A | 3/1990 | Seksaria |
| 4,915,058 A | 4/1990 | Murray |
| 4,947,596 A | 8/1990 | Kight |
| 4,959,117 A | 9/1990 | De Leonibus et al. |
| 4,971,028 A | 11/1990 | Fagan |
| 4,979,323 A | 12/1990 | Wenkman et al. |
| 4,984,760 A | 1/1991 | Cohn et al. |
| 4,991,806 A | 2/1991 | Nakamura et al. |
| 5,016,937 A | 5/1991 | White |
| 5,031,684 A | 7/1991 | Soong et al. |
| 5,039,045 A | 8/1991 | Adams et al. |
| 5,048,258 A | 9/1991 | Grether |
| 5,075,991 A | 12/1991 | Wenkman et al. |
| 5,085,390 A | 2/1992 | Murphy |
| 5,116,274 A | 5/1992 | Artwohl et al. |
| 5,126,926 A | 6/1992 | Chiang |
| 5,137,238 A | 8/1992 | Hutten |
| D331,211 S | 11/1992 | Harris |
| 5,168,636 A | 12/1992 | Golden |
| 5,174,607 A | 12/1992 | Hill |
| D332,390 S | 1/1993 | Adams |
| 5,247,391 A | 9/1993 | Gormley |
| D340,181 S | 10/1993 | Adams |
| D345,903 S | 4/1994 | Adams |
| 5,319,879 A | 6/1994 | Rozycki |
| 5,333,665 A | 8/1994 | Safar |
| 5,345,743 A | 9/1994 | Baier |
| 5,363,595 A | 11/1994 | Wirsing |
| 5,390,837 A | 2/1995 | Ruffolo, Jr. |
| 5,395,159 A | 3/1995 | Pinto |
| 5,405,112 A | 4/1995 | Trethewey |
| 5,429,335 A | 7/1995 | Cunningham |
| 5,441,095 A | 8/1995 | Trethewey |
| 5,465,776 A | 11/1995 | Mirza |
| 5,483,916 A | 1/1996 | Kolvites et al. |
| 5,485,709 A | 1/1996 | Guillemet |
| 5,489,890 A | 2/1996 | Moser |
| 5,496,598 A | 3/1996 | Delisle et al. |
| 5,511,752 A | 4/1996 | Trethewey |
| RE35,291 E | 7/1996 | Lafond |
| 5,550,681 A | 8/1996 | Mazarac |
| 5,551,657 A | 9/1996 | Liethen |
| 5,552,768 A | 9/1996 | Mikiel et al. |
| 5,553,420 A | 9/1996 | Klimek |
| 5,554,421 A | 9/1996 | Delisle et al. |
| 5,573,214 A | 11/1996 | Jones et al. |
| 5,588,476 A | 12/1996 | Trethewey |
| 5,606,129 A | 2/1997 | Lehmann |
| 5,622,414 A | 4/1997 | Artwohl et al. |
| 5,640,815 A | 6/1997 | Chinzi |
| 5,645,254 A | 7/1997 | Ng et al. |
| 5,776,506 A | 7/1998 | Thomas et al. |
| 5,784,213 A | 7/1998 | Howard |
| 5,787,956 A | 8/1998 | Chen |
| 5,794,404 A | 8/1998 | Kim |
| 5,799,661 A | 9/1998 | Boyd et al. |
| 5,825,564 A | 10/1998 | Mazarac |
| 5,897,158 A | 4/1999 | Henke |
| 5,937,595 A | 8/1999 | Miller |
| 5,950,398 A | 9/1999 | Hubbard |
| 5,962,072 A | 10/1999 | Yerman |
| 5,979,889 A | 11/1999 | Klopfenstein |
| 5,996,951 A | 12/1999 | O'burill et al. |
| 6,053,356 A | 4/2000 | Emoff et al. |
| 6,089,517 A | 7/2000 | Johnstone |
| 6,148,890 A | 11/2000 | Lafond |
| 6,155,009 A * | 12/2000 | Pena ................................ 52/202 |
| 6,167,661 B1 | 1/2001 | Christensen |
| 6,180,196 B1 | 1/2001 | Glover et al. |
| 6,192,967 B1 | 2/2001 | Huang |
| 6,247,518 B1 | 6/2001 | Wickersty |
| 6,252,185 B1 | 6/2001 | Shibata et al. |
| 6,339,909 B1 | 1/2002 | Brunnhofer et al. |
| 6,375,143 B1 | 4/2002 | Burns |
| 6,381,917 B1 | 5/2002 | Thielow et al. |
| 6,400,334 B1 | 6/2002 | Lindenmeier et al. |
| 6,412,225 B1 | 7/2002 | Mcmanus |
| 6,464,185 B1 | 10/2002 | Minelli et al. |
| 6,485,106 B1 | 11/2002 | Hermansen et al. |
| 6,502,355 B1 * | 1/2003 | Bori ................................ 52/202 |
| 6,525,651 B1 | 2/2003 | Heller |
| 6,578,326 B1 | 6/2003 | Dyrby et al. |
| 6,606,837 B2 | 8/2003 | Trpkovski et al. |
| 6,625,927 B2 | 9/2003 | Woodruff |
| 6,651,831 B2 | 11/2003 | Samelson |
| 6,658,775 B1 | 12/2003 | Lanzisero |
| 6,662,523 B2 | 12/2003 | Hornung et al. |
| 6,663,064 B1 | 12/2003 | Langner et al. |
| 6,666,251 B2 | 12/2003 | Ikle |
| 6,679,013 B2 | 1/2004 | Hornung |
| 6,688,027 B2 | 2/2004 | Fink |
| 6,749,797 B2 | 6/2004 | Kownacki et al. |
| 6,824,000 B2 | 11/2004 | Samelson |
| 6,829,861 B1 | 12/2004 | Kobrehel et al. |
| 6,848,492 B2 * | 2/2005 | Thomas ..................... 160/368.1 |
| 6,869,053 B2 | 3/2005 | Adams, IV |
| 6,877,286 B2 | 4/2005 | Johnson |
| 6,880,790 B2 | 4/2005 | Lutz |
| 6,883,930 B2 | 4/2005 | Saban et al. |
| 6,889,480 B2 | 5/2005 | Guhl et al. |
| 6,898,907 B2 * | 5/2005 | Diamond ........................ 52/202 |
| 6,918,426 B1 | 7/2005 | Westby |
| 6,928,776 B2 | 8/2005 | Hornung |
| 6,941,700 B1 | 9/2005 | Kobrehel et al. |
| 6,971,205 B2 | 12/2005 | Woodruff |
| 6,974,518 B2 | 12/2005 | Hornung et al. |
| 6,991,346 B2 | 1/2006 | Saban et al. |
| 7,059,482 B2 | 6/2006 | Reid et al. |
| 7,064,831 B2 | 6/2006 | Lutz et al. |

(56) References Cited

U.S. PATENT DOCUMENTS

| | | |
|---|---|---|
| 7,093,643 B2 | 8/2006 | Ikle |
| D542,935 S | 5/2007 | Tedford |
| 7,228,662 B1 | 6/2007 | John |
| 7,229,059 B1 | 6/2007 | Hood |
| 7,244,325 B2 | 7/2007 | Abate et al. |
| 7,259,727 B2 | 8/2007 | Chan |
| 7,293,391 B2 | 11/2007 | Guhl et al. |
| 7,311,112 B2 | 12/2007 | Pacheco |
| 7,325,365 B2 | 2/2008 | Warner |
| 7,380,759 B1 | 6/2008 | Whiteside et al. |
| 7,455,269 B1 | 11/2008 | Chien et al. |
| 7,464,506 B2 * | 12/2008 | Atkinson ............... 52/202 |
| 7,518,741 B2 | 4/2009 | Miyata |
| 7,651,063 B2 | 1/2010 | Jensen |
| 7,665,706 B2 | 2/2010 | Chien et al. |
| 7,705,720 B2 | 4/2010 | Jachmann |
| 7,735,271 B1 | 6/2010 | Shipston et al. |
| 7,763,334 B2 * | 7/2010 | Berkowitz ............... 428/34 |
| 7,770,353 B2 | 8/2010 | Olsen |
| 7,805,897 B2 | 10/2010 | Holland et al. |
| 7,806,484 B1 | 10/2010 | Young |
| 7,818,927 B1 | 10/2010 | John |
| 7,829,003 B2 | 11/2010 | DeBiasi et al. |
| 7,836,638 B2 | 11/2010 | Ogieglo |
| 7,866,101 B2 | 1/2011 | Boggs, Jr. |
| 7,886,651 B2 | 2/2011 | Hall |
| 7,900,408 B2 | 3/2011 | Holland et al. |
| 7,963,075 B2 | 6/2011 | Howland |
| 8,039,102 B1 | 10/2011 | Lavature et al. |
| 8,109,235 B2 | 2/2012 | Lipscomb et al. |
| 8,151,542 B2 | 4/2012 | Trpkovski |
| 8,151,687 B2 | 4/2012 | Hall |
| 8,171,681 B2 | 5/2012 | Miller |
| 8,181,400 B2 | 5/2012 | Kindschuh |
| 8,206,631 B1 | 6/2012 | Sitti et al. |
| 8,245,619 B2 | 8/2012 | Hall |
| 8,256,122 B2 | 9/2012 | Hatfield |
| 8,272,178 B2 * | 9/2012 | Pardue et al. ............... 52/202 |
| 8,276,498 B1 | 10/2012 | Hannibal et al. |
| 8,297,003 B2 | 10/2012 | Kollegger et al. |
| 8,316,613 B2 | 11/2012 | Hall |
| 8,393,113 B2 | 3/2013 | Rex |
| 8,393,584 B2 | 3/2013 | Burns |
| 8,398,909 B1 | 3/2013 | Sitti et al. |
| 8,402,714 B2 | 3/2013 | Labrecque |
| 8,402,716 B2 | 3/2013 | Tinianov et al. |
| 8,439,154 B1 | 5/2013 | Lewis et al. |
| 8,490,345 B2 | 7/2013 | Fields |
| 8,490,346 B2 | 7/2013 | Wedren |
| 8,550,140 B2 * | 10/2013 | Kelley ............... 160/90 |
| 8,572,911 B1 | 11/2013 | Binienda |
| 8,586,193 B2 | 11/2013 | Rapp et al. |
| 8,590,229 B2 | 11/2013 | Taylor et al. |
| 8,590,261 B2 | 11/2013 | Deiss et al. |
| 8,595,994 B1 | 12/2013 | Grommesh et al. |
| 8,596,024 B2 | 12/2013 | Trpkovski |
| 8,643,933 B2 | 2/2014 | Brown |
| 8,656,665 B2 | 2/2014 | Rotter |
| 8,695,309 B2 | 4/2014 | Deiss et al. |
| 8,713,865 B2 | 5/2014 | Hall |
| 8,733,040 B2 | 5/2014 | Paetow et al. |
| 8,757,186 B2 | 6/2014 | Vulpitta et al. |
| 8,789,343 B2 | 7/2014 | Zurn et al. |
| 8,795,568 B2 | 8/2014 | Trpkovski |
| 8,839,564 B2 | 9/2014 | Happel et al. |
| 8,851,423 B1 | 10/2014 | Lewis et al. |
| 8,869,473 B2 | 10/2014 | Melesky |
| 8,875,774 B1 | 11/2014 | Flores |
| 2001/0009179 A1 | 7/2001 | Huang |
| 2002/0100562 A1 | 8/2002 | Ikle |
| 2002/0189743 A1 | 12/2002 | Hornung et al. |
| 2003/0041557 A1 | 3/2003 | Trpkovski et al. |
| 2003/0089054 A1 | 5/2003 | Hornung |
| 2003/0145532 A1 | 8/2003 | Kownacki et al. |
| 2003/0226332 A1 | 12/2003 | Trpkovski et al. |
| 2004/0080749 A1 | 4/2004 | Lutz et al. |
| 2004/0123627 A1 | 7/2004 | Larsen |
| 2004/0159057 A1 | 8/2004 | Hornung |
| 2004/0221967 A1 | 11/2004 | Ikle |
| 2004/0226208 A1 | 11/2004 | Kownacki et al. |
| 2005/0194086 A1 | 9/2005 | Abate et al. |
| 2005/0223663 A1 | 10/2005 | Schuler |
| 2006/0124164 A1 | 6/2006 | Pacheco |
| 2006/0127612 A1 | 6/2006 | Larsen |
| 2007/0017997 A1 | 1/2007 | Talley et al. |
| 2007/0042703 A1 | 2/2007 | Lee |
| 2008/0063767 A1 | 3/2008 | Sus et al. |
| 2008/0127581 A1 | 6/2008 | Walters |
| 2008/0190070 A1 | 8/2008 | Duncan et al. |
| 2008/0245002 A1 | 10/2008 | van de Linde et al. |
| 2009/0076650 A1 | 3/2009 | Faes |
| 2009/0249694 A1 | 10/2009 | Nilsson |
| 2010/0122782 A1 | 5/2010 | Fox et al. |
| 2010/0287851 A1 | 11/2010 | Kindschuh |
| 2011/0009929 A1 | 1/2011 | Nuccitelli et al. |
| 2011/0030290 A1 | 2/2011 | Slovak et al. |
| 2011/0071524 A1 | 3/2011 | Keller |
| 2011/0079011 A1 | 4/2011 | Sabo |
| 2011/0258921 A1 | 10/2011 | Rotter |
| 2011/0298721 A1 | 12/2011 | Eldridge |
| 2012/0285588 A1 | 11/2012 | Sheppard |
| 2012/0319320 A1 | 12/2012 | Sitti et al. |
| 2012/0324806 A1 | 12/2012 | Chen |
| 2012/0328822 A1 | 12/2012 | Sitti et al. |
| 2013/0157493 A1 | 6/2013 | Brown |
| 2013/0251937 A1 | 9/2013 | Sitti et al. |
| 2014/0331578 A1 * | 11/2014 | Wexler et al. ............... 52/204.62 |
| 2015/0068140 A1 * | 3/2015 | Wexler ............... 52/203 |

FOREIGN PATENT DOCUMENTS

| | | |
|---|---|---|
| WO | WO2014/144136 | 9/2014 |
| WO | WO2014/152485 | 9/2014 |

* cited by examiner

C'-C AT D-D'

SUPPLEMENTAL WINDOW FOR FENESTRATION

REFERENCE TO PRIORITY APPLICATION

This application is a continuation-in-part of U.S. application Ser. No. 13/735,449, filed Jan. 7, 2013, now U.S. Pat. No. 8,923,650, entitled "System and Method of Measuring Distances Related to an Object," incorporated herein by reference in its entirety.

FIELD OF THE INVENTION

The present invention relates generally to fenestration and in particular to a supplemental window and related method of construction for use with existing windows.

BACKGROUND OF THE INVENTION

In recognition of the ecological and cost impact of fossil fuels and other conventional energy sources, significant effort has been expended in developing methods for more efficient use of such energy sources. An important area of energy use for which greater energy efficiency is needed is the heating and cooling of spaces in which human activity is desired. Many approaches have been developed to decrease the amount heat transfer through the shell of such spaces. One of the most active and important areas of activity is the transfer of energy through fenestration where the activity has included use of window films or inserts, increasing the number of glazings per opening, and window treatments such as drapes, blinds, etc. While these approaches have shown considerable improvement in building energy efficiency, significant problems prevent more widespread and effective utilization.

Several problems exist in the approaches to minimizing heat transfer through fenestration. In particular for existing windows, it is desirable to maintain undistorted optical transparency, operation of the window treatments and windows and the aesthetics of the interior view of the window while providing thermal insulation. Furthermore, reuse of the insulating materials is highly desirable so that new materials do not need to be purchased each season. Supplemental window elements known in the art either require the end user to customize supplemental window elements to the dimensions of each window at the site of installation or are designed in ways that make size customization difficult in manufacturing.

When adding supplemental window elements such as films, film support elements and window treatments, ease of installation (including measurement and fabrication), reusability and storage and aesthetics during and after use are very important while obtaining the thermal and radiation insulation desired. With window films intended for creating an additional "dead air" insulating layer adjacent to the window as well as window treatments, the dimension of the "dead air" space perpendicular to the window pane is subject to the film attachment areas that are generally dictated by existing features of the window and/or frame. In addition, such window films often must be mounted in such a way that inhibits the operability of non-fixed windows. Further, such window films are generally made for use only on the interior side of the window pane. Other window films, such as tints, infrared or ultraviolet reflective, or low-e films, generally adhere directly to the window pane and do not allow for simultaneous formation of an insulating layer.

There is thus a need a need for a supplemental window that overcomes the disadvantages of prior art supplemental windows and that is effective at minimizing heat loss, retains transparency, is low cost, easy to install and remove and does not impede the operability of the existing window.

SUMMARY OF THE INVENTION

The present invention is a supplemental window for fenestration suitable for use with existing windows. The supplemental window, in one embodiment, comprises a frame with plastic sheet material stretched across it. An attachment mechanism secured to the frame functions to fasten the supplemental window to an existing window. A seal attached to the frame functions to trap a volume of air between the window pane and the plastic sheet material. The supplemental window is configured such that the layer of trapped air is of an optimum thickness of 0.15 to 0.75 inches to maximize thermal insulation properties of the supplemental window.

Several advantages of the supplemental window include (1) minimizing heat transfer; (2) retaining visual transparency through the window; (3) having a relatively low cost of manufacture; and (4) being configured to not impede the operability of the existing window or associated window treatments.

The aesthetics of the fenestration during and after use of the supplemental window can be maintained. This relates to maintaining the appearance of the interior view of the fenestration and its immediate surrounding as well as the ability to see through the fenestration when desired. Also, it relates to the ability to return the fenestration to its original state when the supplemental element is not being used without the need to repair mounting areas.

Operability of the fenestration and associated treatment during use of the supplemental window can be maintained without the need to demount the supplemental window. Since the fenestration is often designed for opening and closing, it is beneficial to maintain this capability while the supplemental window is in place. This would allow for temporarily bringing fresh air into the space adjacent to the fenestration. This can be particularly useful during periods of moderate temperatures within a heating or cooling season.

The supplemental window also provides the ability to gain energy efficiency improvement during both heating and cooling seasons. The advent of spectrally selective, infrared reflective and low-emissivity coatings or laminates for window films provides for additional energy savings. Optimal placement of such films, however, requires the ability to move such films to either keep heat in during the heating season or keep heat out in the cooling season.

There is thus provided in accordance with the invention, a supplemental window apparatus, comprising a contiguous frame defining a perimeter area, a substantially non porous sheet material attached to the contiguous frame covering the perimeter area, an attachment mechanism operative to detachably attach the contiguous frame to a window pane and to set the distance between the window pane and the substantially non porous sheet material when the supplemental window apparatus is attached to the window pane and a seal in contact with the contiguous frame such that when the contiguous frame is attached to the window pane a volume of gas is trapped between the window pane and the substantially non porous sheet material.

There is also provided in accordance with the invention, a supplemental window apparatus, comprising a contiguous frame defining a perimeter area, a substantially non porous sheet material attached to the contiguous frame covering the perimeter area, an attachment mechanism operative to hold the contiguous frame to a window frame utilizing outward pressure against the window frame, a seal in contact with the contiguous frame such that when the contiguous frame is attached to the window pane a volume of gas is trapped between the window pane and the substantially non porous sheet material and one or more spacers operative to set the distance between the window pane and the substantially non porous sheet material when the supplemental window apparatus is set held in place to the window frame.

There is further provided in accordance with the invention, a method of providing a supplemental window, comprising providing a contiguous frame defining a perimeter area, attaching substantially non porous sheet material to the contiguous frame so as to cover the perimeter area, providing an attachment mechanism operative to detachably attach the contiguous frame to a window pane and to set the distance between the window pane and the substantially non porous sheet material when the supplemental window apparatus is attached to the window pane and sealing the contiguous frame such that when the contiguous frame is attached to the window pane a volume of gas is trapped between the window pane and the substantially non porous sheet material.

BRIEF DESCRIPTION OF THE DRAWINGS

The invention is herein described, by way of example only, with reference to the accompanying drawings, wherein.

DETAILED DESCRIPTION OF THE INVENTION

Figure 1A:
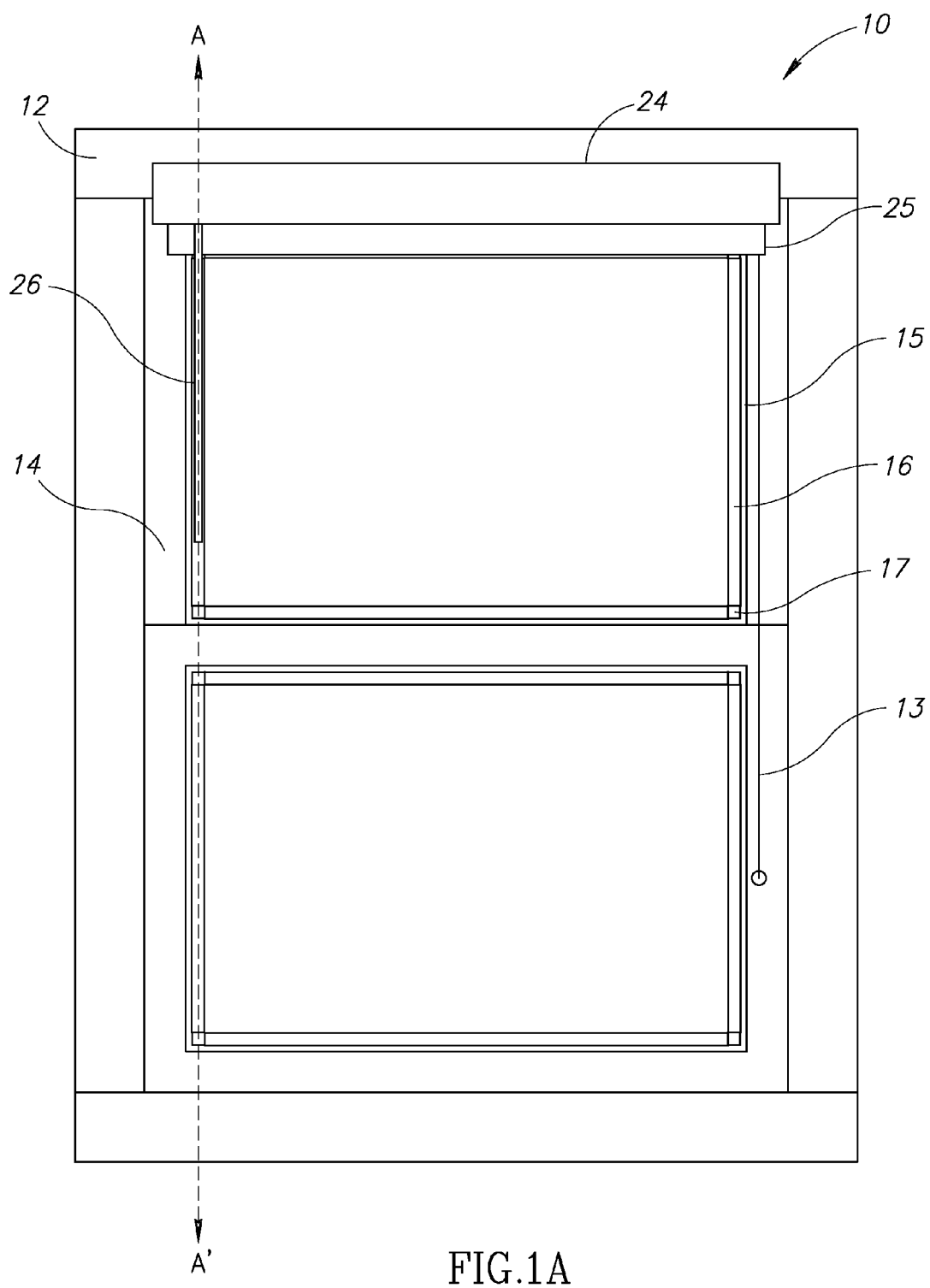
FIG. 1A is a diagram illustrating a front view of a first example window.

The present invention provides for several embodiments for mounting of sheet material in or over fenestration and substantially enclosing a volume of gas in or adjacent to the fenestration. In the present invention, the sheet material, a spacer of predetermined length, a supplemental window frame and a compressible perimeter closure together provide a supplemental window unit that substantially encloses and traps a volume of gas (typically air). Optionally, the clear sheet material may function as a portion of the compressible perimeter closure. In one embodiment, the spacer may contact or attach to the window pane of the fenestration. The sheet material can be any desired type of material such as, but not limited to, clear, non-opaque, visible light transmitting, infrared reflecting, material having minimal refractive distortion when viewed from the interior side of the window, etc. The extent of visible light transmission properties of the sheet material is not critical to the invention.

Such embodiments may be specified using manual measurement of the fenestration or portions thereof or, specified and delivered using the methods described in U.S. application Ser. No. 13/735,449 to Wexler cited supra and U.S. application Ser. No. 14/320,973, entitled "System And Method Of Measuring Distances Related To An Object" to Wexler, both of which are incorporated herein by reference in their entirety.

Various terms are used in the art to describe aspects of fenestration and windows in particular. In describing the present invention, "window" may refer to a single frame, one or more frames within a complex or an entire complex frame. A "complex" frame refers to multiple windowpanes within the same frame. In describing the present invention, the terms "interior" and "exterior" are used to describe the indoor side and outdoor side, respectively, relative to a perimeter wall in which the fenestration resides. "Inward" and "outward" facing refers to frame surfaces perpendicular to the perimeter wall plane facing toward or away from, respectively, the center of the fenestration.

Note that various people or entities may perform different aspects of the present invention. An "end user" refers to a person or entity or their designee, that specifies, orders, installs or uses the supplemental parts of the present invention and may perform digital image capture, supply metadata and/or confirmation of design steps of the process of the present invention. A "service provider" refers to a person or entity performing a service that is part of the method of the present invention such as reviewing and accepting or confirming orders from an end user, providing image processing capability, designing (as a "designer"), fabricating (as a "fabricator") or installing (as an "installer") parts, or providing support for installation of such parts.

Each supplemental window embodiment creates a substantially "dead air" space or layer of trapped air adjacent to a window pane, preferably having a dimension between the window pane and clear sheet of between approximately 0.15 to 0.75 inches which optimizes insulating properties and prevents the formation of convective loops. A dimension less than about 0.15 inches impacts insulating properties and a dimension greater than about 0.75 inches may lead to undesirable convective heat transfer. Such "dead air" spaces optionally may have a desiccant material contacting the "dead air" space to keep the humidity of the space low and decrease the possibility of condensation forming in the space, particularly when one side of the space is a window pane in direct contact with the outdoors.

To allow for actuation of window or window treatment operating elements with the supplemental parts mounted, the plastic sheet may be mounted such that the entire supplemental window unit is mounted out of the movement path of any window treatment, window treatment operating elements or moveable portions of the window.

A diagram illustrating a front view of a first example window with interior mounting arrangement is shown in FIG. 1A for a vertical sliding (single or double hung) window having a bottom sash that is moveable. The window, generally referenced 10, comprises an existing window frame 12, upper sash 14 holding the window pane, the supplemental window frame 16, sealing mechanism 15, window treatment (e.g., blind) including header 24, refracted blind 25, lift cord 13 and wand 26. The sheet material is not shown in this figure for clarity purposes.

Figure 1B:
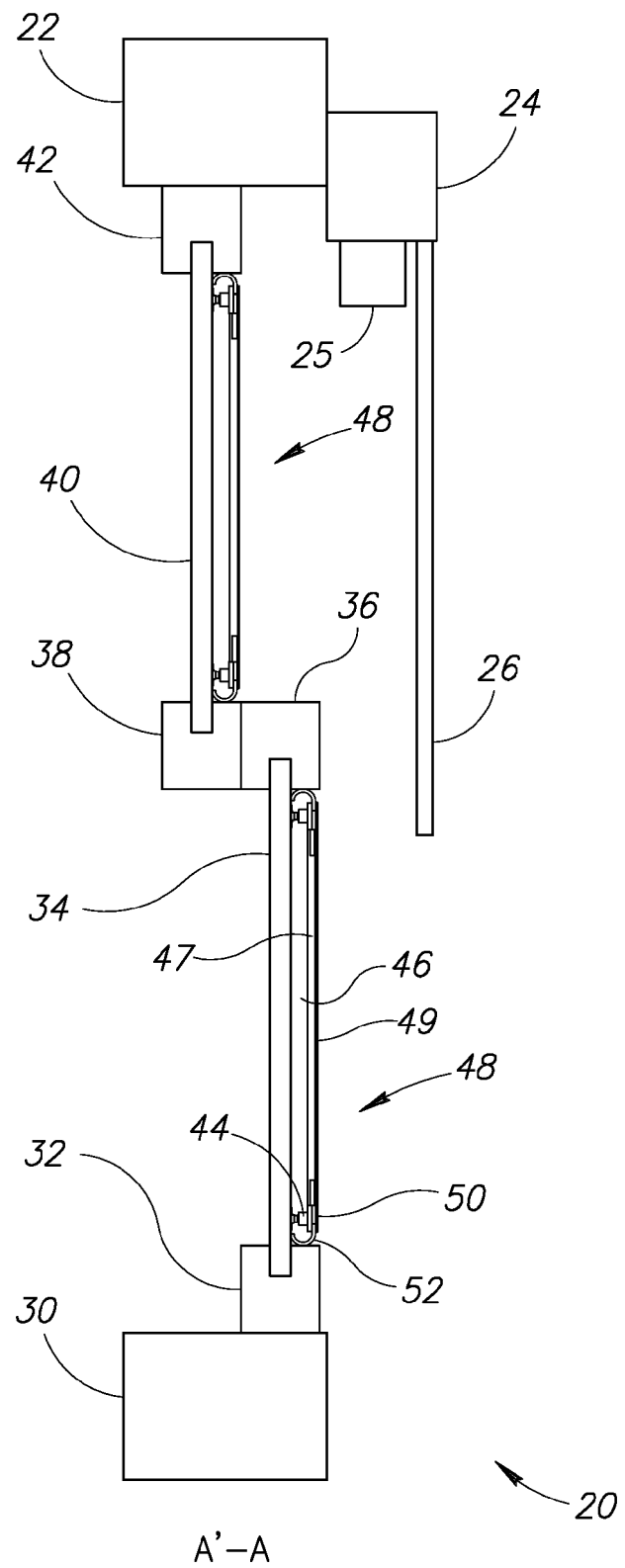
FIG. 1B is a diagram illustrating a side sectional view A-A' of the example window of FIG. 1A.

A diagram illustrating a side sectional view A-A' of the example window of FIG. 1A is shown in FIG. 1B. The window, generally referenced 20, comprises lower existing window frame sill 30, upper existing window frame header 22, window treatment (e.g., blind) including header 24, retracted blind 25 and wand 26, lower window pane 34, lower sash rail 32 of the lower window, upper sash rail 36 of the lower window, upper window pane 40, lower sash rail 38 of the upper window, upper sash rail 42 of the upper window and upper and lower supplemental window 48. Both lower and upper supplemental window frames 48 comprise attachment mechanism 50 (e.g., suction cups, adhesive, etc.), spacer 44, sealing mechanism 52, plastic sheet 49, trapped space (e.g., air) 46 between the plastic sheet and window pane and supplemental frame side member 47.

In this embodiment, the attachment mechanism provides a second function of providing the optimum spacing between the window pane and the sheet material of the supplemental window. Alternatively, these functions may be provided by independent elements, e.g., a separate discreet offset spacer is inserted between the window pane and the sheet material, the spacer function is provided by the spacer mechanism or any other suitable means for providing this function. In these alternative embodiments, the attachment mechanism is not required to perform any spacing function and thus there is no spacing related constraint on the dimensions of this element.

Note that the spacing function can be achieved in numerous ways with the actual implementation not critical to the invention. In one embodiment, the spacing function can be provided by a discrete spacer part such as 44 (FIG. 1B). In another embodiment, the spacer function can be incorporated into the attachment mechanism (i.e. the post or mounting mechanism can be made a specific length to provide the proper spacing between the window pane and plastic sheet. Alternatively, the spacing function can be incorporated into the corner member via a projection or other means where the thickness of the corner member and any projection is set to a length that provides the proper spacing between the window pane and plastic sheet.

In the window of FIGS. 1A and 1B, the attachment mechanism and viewable area through the plastic sheet are predominantly within the pane viewable area. For interior or exterior mounting, the supplemental window unit spacing and thickness dimensions that would reside within the sash-to-sash interface during opening and closing operation of the window may beneficially be made smaller than the spacing and thickness dimensions of the supplemental window unit that would not reside in the sash-to-sash interface during operation of the window. As is also shown in FIGS. 1A and 1B, the supplemental window unit on the top sash is exterior to the movement path of the bottom sash so that the window remains operable with the supplemental window unit in place.

In the case of vertical or horizontal sliding windows, the spacing dimension over the stationary portion may beneficially be made smaller (e.g., about 0.15 inch) than the spacing dimension over the sliding portion to allow the custom supplemental window unit to remain in place when opening the window by sliding the sliding portion. In such a case, the supplemental window frame members for mounting the plastic sheet should also have a dimension perpendicular to the attached plastic sheet of less than about 0.25 inch. A similar mounting arrangement may be used for horizontal sliding windows to allow operability of the window. Alternatively, operability of the sliding portions of windows may be achieved by dismounting the supplemental parts on the stationary sash prior to opening the window and remounting after closing the window. In such cases, the supplemental window unit spacing dimension on the non-moving sash may be made larger than the distance between the non-moving sash pane and movable sash.

Figure 2:
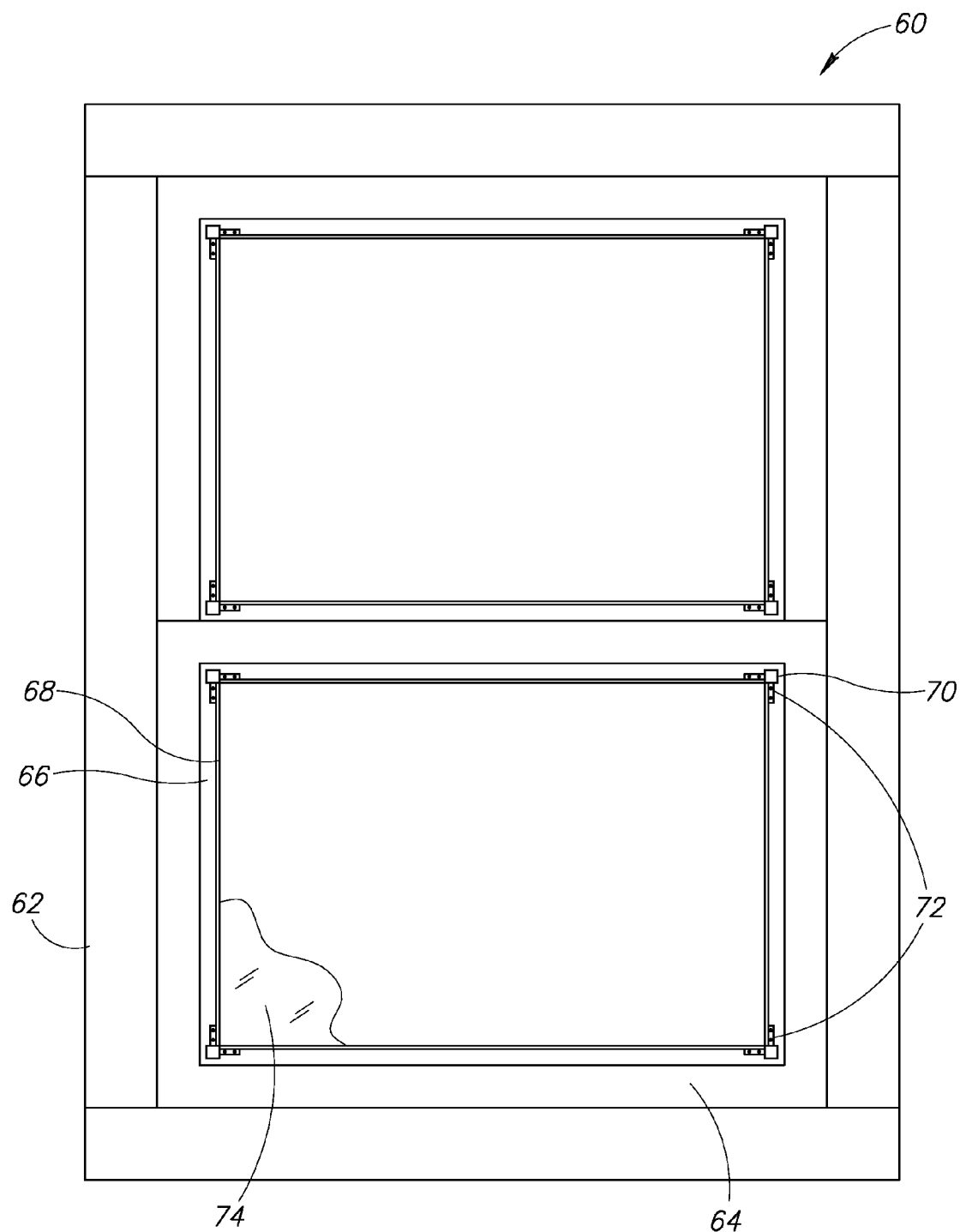
FIG. 2 is a diagram illustrating additional detail of the front view of the example window of FIG. 1A.

A diagram illustrating additional detail of the front view of the example window of FIG. 1A is shown in FIG. 2. In this figure, the supplemental frame side members are not shown to reveal the corner members 70, projections 72 which the side members slip into, spline 68 which holds the plastic sheet 74 in place and compressible insulating material 66. The window, generally referenced 60, comprises a window frame 62 and lower sash 64.

Figure 3:
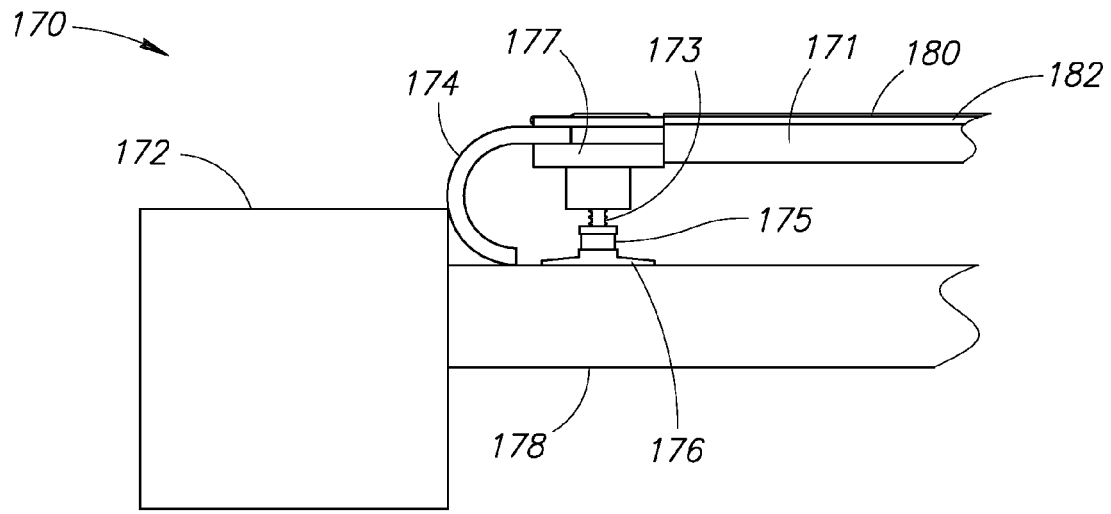
FIG. 3 is a diagram illustrating a first example sealing mechanism of the present invention.

In other embodiments, there is an adjustable feature of the mounting parallel to the plane of the fenestration, examples of which are shown in FIGS. 1A, 1B, 2, 3, 4, 5, 7A, 7B, 9A, 9B, 9C, 10A, 10B, 11, 12A, 12B, 12C, 13B, 14A, and 14B, In one embodiment, a plastic sheet is positioned substantially parallel to and at a predetermined distance from a window pane. One embodiment has a continuously adjustable feature which is a compressible portion of a custom supplemental window unit that substantially blocks the perimeter of the air space created when the plastic sheet is mounted. Such compressible portions may contact inward facing surfaces of the frame or sash as well as the window pane as shown in FIG. 3. The continuously adjustable feature may be provided by using, for example, a closed cell polymer sheet that can bend and/or compress.

In another embodiment, the plastic sheet may extend outward of the supplemental window frame in which case the sheet may bend and/or compress to provide a portion of the perimeter closure. Optionally, a second adjustable feature may include a continuously or discretely settable locking element that allows for the choice of multiple set positions of custom supplemental parts with respect to each other, such as described in U.S. patent application Ser. No. 13/735,449 to Wexler cited supra.

Referring to FIGS. 1A and 1B, an example interior mounting scheme for window thermal insulation is shown. Four individual substantially linear structural grooved mounting frame members 16 (groove opening facing the exterior or inward direction) are arranged in successive longitudinal end to end relation for forming a rectangular shaped generally planar support in conjunction with right angle connector corner members 17. Alternatively, the right angle connector portion of each corner member may be omitted and the supplemental window frame members may be mitered and joined at each corner using any suitable well-known joining process, for example, welding, adhesive, etc., with the spacing portion of the corner member attached at or near the joined corner. Corner members 17 provide a predetermined space between the window pane 40 and plastic sheet 49 when the attachment mechanism 50 (e.g., suction cups) are compressed against the window pane. Plastic sheet 49 is attached to or held in contact with the supplemental window frame members and/or corner members such that the plastic sheet is substantially parallel to the plane of the supplemental window frame.

Attachment of the plastic sheet to the supplemental window frame members may be accomplished with a groove and spline arrangement, heat sealing, welding, adhesive or clip mechanism. Between the supplemental window unit perimeter and the window pane, compressible insulating material 15, 52 may be placed substantially enclosing space between the plastic sheet and the window pane. In one embodiment, the compressible insulating material 15, 52 may hold the plastic sheet in contact with supplemental window frame members or may comprise a slit in which the plastic sheet edge may fit. Compressible insulating material may comprise any suitable material such as an open cell or closed cell polymer foam or plastic sheet. When such closed cell polymer foam is a sheet that bends into an arc shape, such as closed cell polyethylene foam sheet, its thickness is preferably in the range of about 0.125 inch to about 0.25 inch.

When held in contact with supplemental window frame members by the compressible insulating material, the plastic sheet may beneficially be attached to the corner members, for example using adhesive or by mechanical pressure between the spacer or spacing portion of the attachment mechanism and the corner member, on the corner member surface parallel and closest to the window pane. When using such mechanical pressure to attach the plastic sheet to the corner members, the plastic sheet may have a notch and/or hole cut or punched at or near each corner of the plastic sheet so that the spacer or spacing portion of the attachment mechanism to corner member connection may pass from one side of the plastic sheet to the other side without substantial deformation of the plastic sheet and allowing the plastic sheet to lie substantially flat against the corner member surface.

In another embodiment with the plastic sheet attached to corner members in this way, a compressible insulating material distinct from the plastic sheet may be omitted and the plastic sheet may have portions extending beyond the outward perimeter of the supplemental window frame that may bend and/or compress (e.g., the arc formed upon bending may compress) and allow the plastic sheet to enclose perimeter sides as has been described for the compressible insulating material. A foam or plastic piece may be provided at each corner in this embodiment, optionally compressed between the spacer or spacing portion of the attachment mechanism and the perimeter-enclosing portion of the plastic sheet, to complete the substantial enclosure of the space between the plastic sheet and the window pane.

Figure 5:
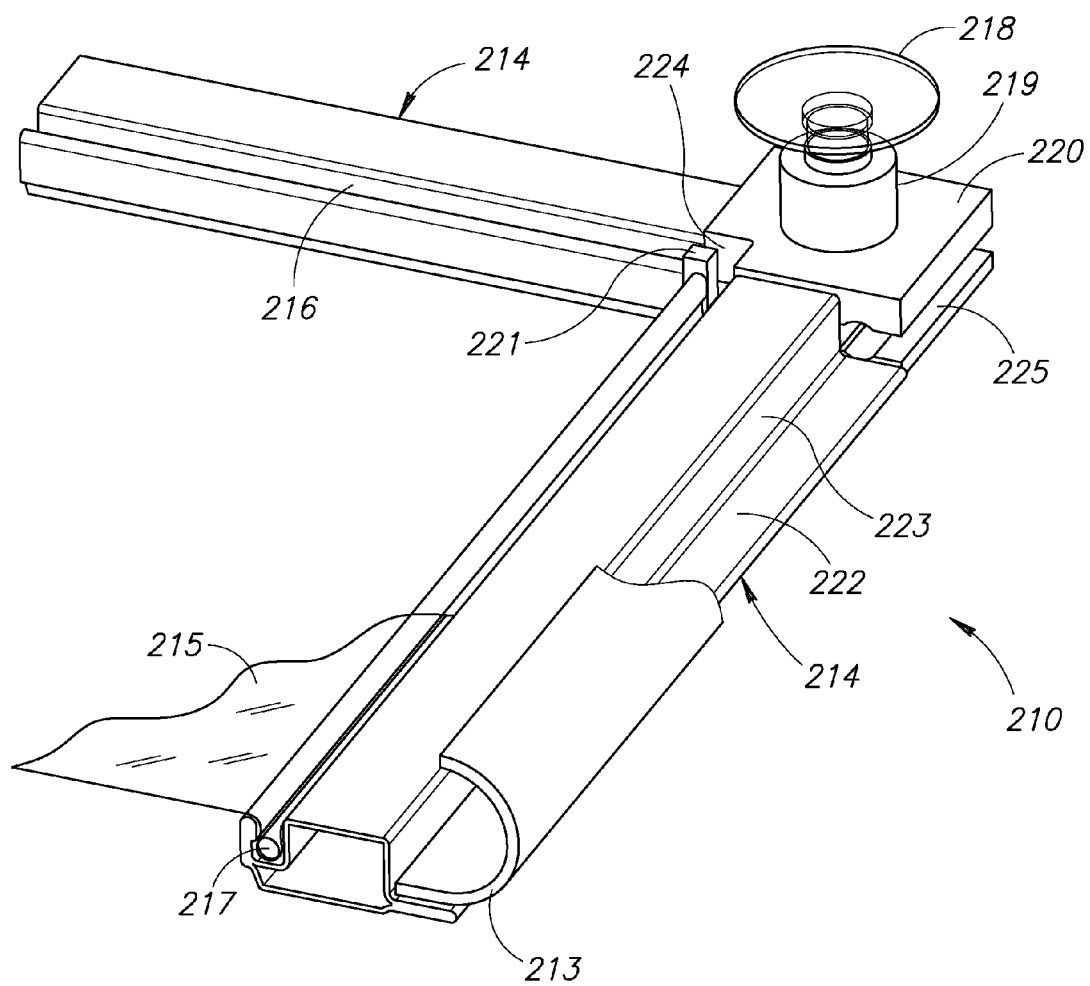
FIG. 5 is a diagram illustrating a corner section of an example frame portion of the supplemental window of the present invention.
Figure 6:
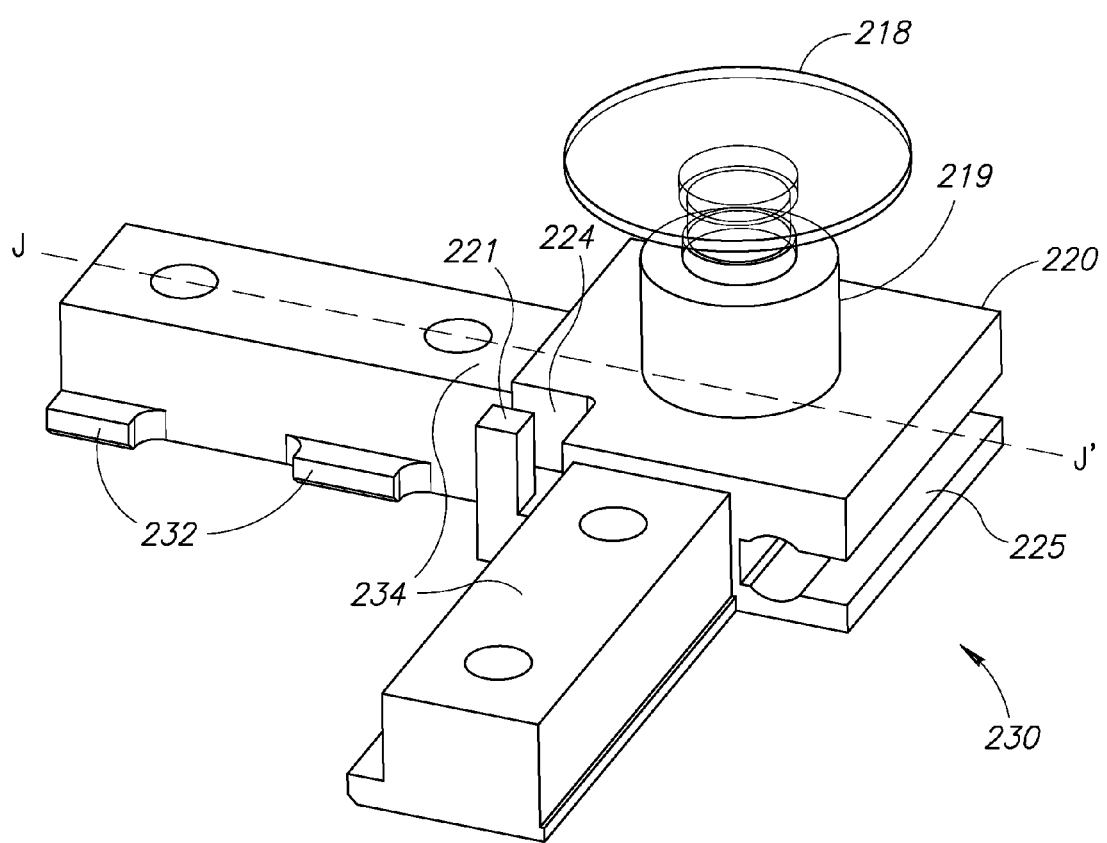
FIG. 6 is a diagram illustrating the corner section of the example frame of FIG. 5 in more detail.

In one embodiment, the supplemental window unit is attached, using a spacing arrangement, which is optionally adjustable in the spacing dimension, to the pane of a closed window using a vacuum attachment such as a suction cup 218 (FIGS. 5 and 6). While FIGS. 5 and 6 show the groove 216 into which the plastic sheet is held as being perpendicular to the plane of the supplemental window unit, in an alternative embodiment, the groove may be oriented in other directions, including parallel to the supplemental window unit plane with the groove opening to the inward side of each supplemental window frame member and the plastic sheet lying flat or folded at each corner.

Similarly, the inward corner of the corner member 220 may also have an inward opening 22 to allow for the folded plastic sheet corner to be held in the corner member groove or the supplemental window frame members 214 may be mitered at the inward corner to accept the folded plastic sheet corner. A spline 217 may be added to secure the plastic sheet 215 in the groove. When such a parallel groove orientation is used, the plastic sheet may be rigid or semi-rigid and inserted into the groove without folding, with a spline or gasket optionally providing a seal within the groove.

The suction cup 218 is attached to corner member 220 via post or spacer 219 such that separation of the compressed suction cup sealing surface plane and the corner member is pre-determined. The corner member may be attached to frame member profiles 214 that act as supplemental window frame members by inserting arms 234 into the end openings of frame member 214, leading to a pre-determined separation of the compressed suction cup sealing surface and the supplemental window frame member grooves in which the plastic sheet is held. Alternatively, the male-female relationship of the corner member and supplemental window frame member may be reversed such that the supplemental window frame member fits into a hole or slot in the corner member. The corner member 220 may also comprise a slot 225 to secure a portion of the seal or compressible insulating material. In addition, the corner member may comprise a groove opening 224 and corner post 221 for aiding to secure the plastic sheet. Note that while the height of the corner post 221 is shown to be aligned with the top of the groove openings 224, alternatively, it may be lower or omitted in order to minimize stress on the plastic sheet at the corner when it is inserted into the grooves.

When corner member 220 has slots 225 parallel to the plane of the supplemental window unit, the compressible insulating material may be held in the slots while pressing against the parallel 222 and/or perpendicular 223 surface of the frame member 214 profile along the outer perimeter formed by the profile. Optionally, frame member 214 may comprise a channel that substantially aligns with a corner member slot 225 of corner member 220 to which the frame member attaches and into which the compressible insulating material may be fit. The compressible insulating material (i.e. seal) 174 (FIG. 3) held in this way may form an arc, for example, that folds back in the inward direction while contacting the window pane 178 and/or sash or window frame 172 as shown in FIG. 3.

Also shown in FIG. 3 are the outward facing surface 171 of the frame member (against which the seal may abut), window sash 172, window pane 178, seal 174 frame member 180, attachment mechanism 176 (e.g., suction cup sealing surface in this example), threaded post 173 and post receiver (suction cup top) 175, corner member 177, frame member extended lip 182 against which the perimeter seal may be compressed for holding the perimeter seal between the frame member and window pane.

The shape of the insulating material arc may change due to its compression between the supplemental window frame members and the window pane, the inward position of the edge nearest the window pane or the extent to which the curved portion is allowed to protrude away from the window pane. Shape change of this material provides a means for dimensional adjustment of the overall custom supplemental window unit parallel to the window pane. When shape change occurs, the edge of material 174 closest to the window pane may contact attachment mechanism 176. Alternatively, the compressible insulating material may contact the hollow core external wall portion of the profile 171 and the corner member surface parallel and closest to the window pane.

At the corner, the compressible insulating material is preferably mitered and may comprise a single continuous piece of material or may comprise more than one piece of material for the perimeter. To complete the substantial enclosure, ends and mitered portions of the compressible insulating material may be overlapped, abutted or joined, preferably using adhesive, welding or heat sealing.

Figure 4:
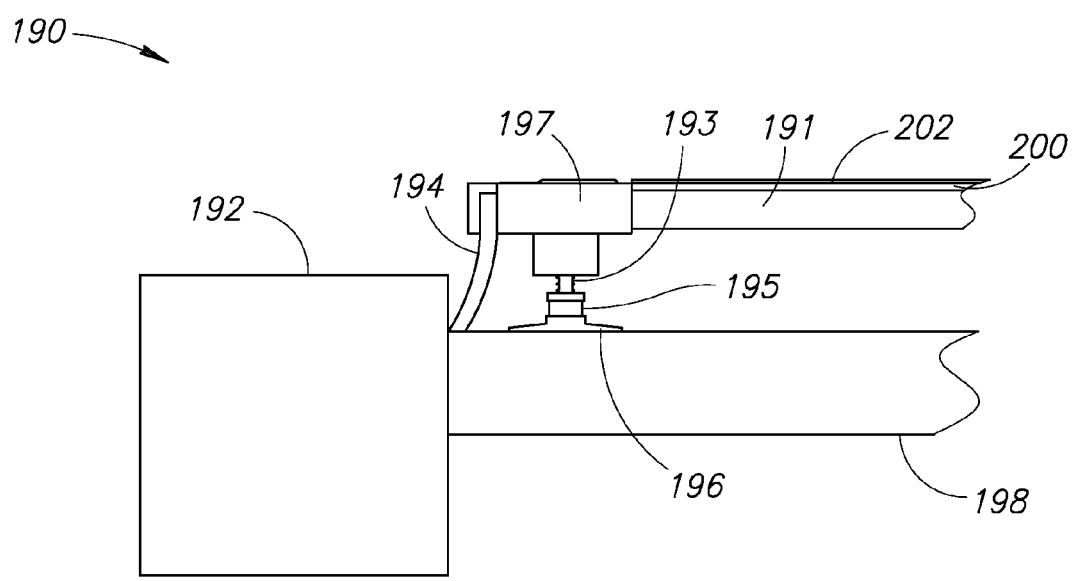
FIG. 4 is a diagram illustrating a second example sealing mechanism of the present invention.

An alternative embodiment, shown in FIG. 4, provides a substantially enclosed space wherein the compressible insulating material 194 is held in a position that is not parallel to the supplemental window frame members and corner member 200. In this embodiment, compressing the insulating material may lead to its edge at the window pane 198 being forced toward or away (not shown) from sash or window frame 192. In such a configuration, the supplemental window frame members may comprise a narrow channel into which the compressible insulating material (e.g., closed cell polymer foam) is compression fit along the perimeter of the supplemental window unit. In addition or alternatively to the compression fit, the closed cell foam may be adhered or otherwise attached to the supplemental window frame.

Also shown in FIG. 4 are the outward facing surface 191 of the frame member (against which the seal may abut), window sash 192, window pane 198, seal 194, frame member 202, attachment mechanism 196 (e.g., suction cup sealing surface in this example), threaded post 193, post receiver (suction cup top) 195, corner member 197 and frame member extended lip 200 to which the perimeter seal may abut for holding the perimeter seal between the frame member and window pane.

To aid the insertion of the closed cell foam into the supplemental frame member channel during assembly, one of the channel sides parallel to the supplemental window frame plane may be flexible enough to allow for temporarily enlarging the channel width opening. Alternatively, the channel into which the closed cell foam sheet is inserted may comprise adjustment means, such as screws, to allow for insertion of the sheet and subsequent clamping between the channel sides parallel to the supplemental window frame plane. After insertion of the closed cell foam into the channel, the channel side is allowed to relax to a position such that it can compress and hold in place the closed cell foam. The channel may be oriented parallel, perpendicular or at an angular orientation such that the closed cell foam, in the form of a sheet will be able to contact at least one of the panes, sash or frame when inserted into the channel. When the channel is not oriented perpendicular to the supplemental window frame plane, it is preferable to miter the closed cell foam sheet at the corners. When mitered, the corners that are formed at the miter joint may be closed by heat sealing, welding or using adhesive. Alternatively or in addition, an additional piece of foam may be used to ensure closure at each miter joint.

A diagram illustrating a corner section of an example frame portion of the supplemental window of the present invention is shown in FIG. 5. A diagram illustrating the corner section of the example frame of FIG. 5 in more detail is shown in FIG. 6. The frame portion, generally referenced 210, shown includes corner member 220, attachment mechanism 218 (e.g., suction cup sealing surface in this example embodiment), spacer portion 219 (spacing connection between the corner member and the suction cup) and side frame members 214. Surface 223 is the outward facing surface of the frame members against which the seal may abut. The side frame members include a groove 216 for retaining a spline 217 inserted to hold the plastic sheet 215 in place. The corner member includes a groove opening 224 to retain the spline. Surface 222 is the frame member extended lip located on the side frame members and slot 225 on the corner member function to mount and retain the seal 213 for trapping a layer of air between the plastic sheet 215 and the window pane (not shown). The seal 213 normally abuts surfaces 222 and 223 of the frame members 214. The seal 213 may be secured to the frame side members using any suitable technique such as adhesive, compression in a frame side member channel as described above, or may be compressibly held in place between frame members and the window pane when the supplemental window is installed. Corner projections 234 are configured to slip into the hollow core in the side frame members and be retained therein via tabs 232.

Figure 7A:
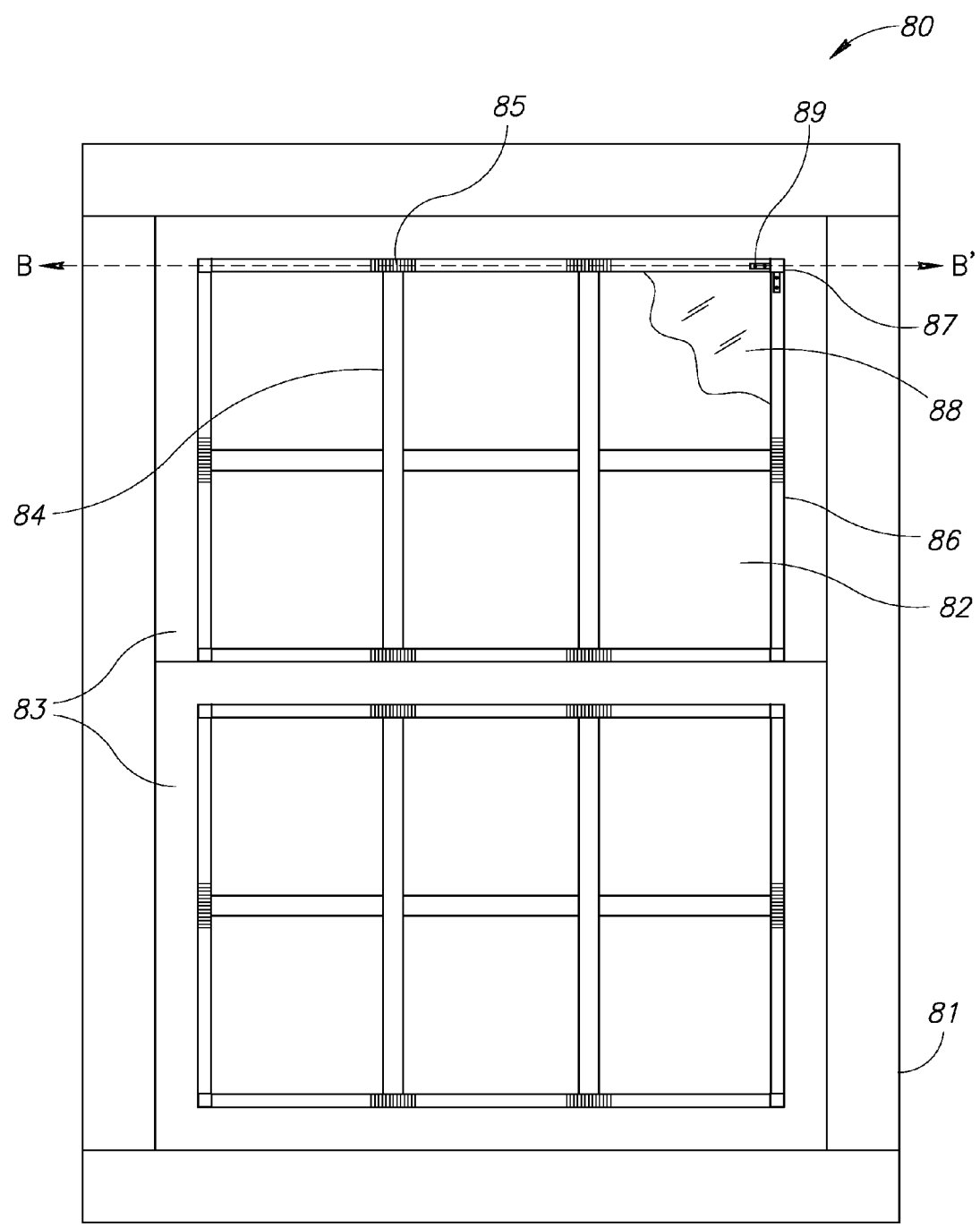
FIG. 7A is a diagram illustrating a front view of a second example window having several muntins.
Figure 7B:
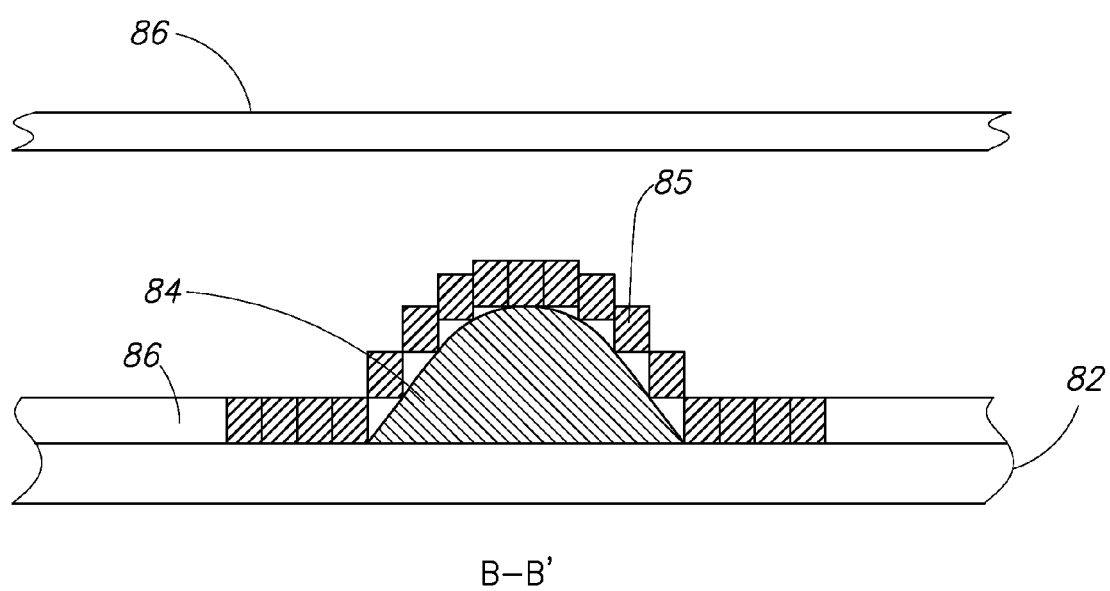
FIG. 7B is a diagram illustrating a side sectional view B-B' of the example window of FIG. 7A.

A diagram illustrating a front view of a second example window having several projecting muntins is shown in FIG. 7A. The window, generally referenced 80, comprises an existing window frame 81, lower and upper sashes 83, seal 86, muntins 84, window pane 82, sheet material 88, and slits 85. Also shown are corner members 87 with corner projections 89. A diagram illustrating a side sectional view at B-B' of slits 85 in the example window of FIG. 7A is shown in FIG. 7B. This side sectional view shows the seal 86 substantially conforming to the muntins 84 to provide a tight seal around the window. The slits 85 in the seal enable it to follow the contours of the window around the muntins. The upper portion of the seal 86 is shown as in this example embodiment, the seal is curved as shown in FIG. 1B (seal 52).

When used on the side of a window having muntins that project toward the side of the pane on which the custom supplemental window unit is to be used, the closed cell foam may be modified based on muntin location (contained in a captured image, provided by the customer, or obtained using any suitable means) so that the closed cell foam better conforms to the non-planar nature of the surface on which it is used. For example, as shown in FIGS. 7A and 7B, one or more slits 85, or alternatively a notch, may be cut in the closed cell foam substantially perpendicular to the perimeter such that the slit or slits are over the muntin 84 and adjacent window pane 82 and minimize loss of contact between the pane or sash and the closed cell foam on either side of the slit or slits. Preferably, the slits may terminate in the half of the arc that is closer to the window pane near the outwardmost portion of the arc. Also, for example, a piece of conformable foam may be roughly shaped to fit over the muntin near the interface between the muntin and closed cell foam sheet to aid in continuity of the enclosure.

For window units that have associated framing that is provided by a manufacturer and when such framing has means for mounting a separately framed screen, attachment of the supplemental window unit may be made to the screen frame. In such a case, the window manufacturer may use its known window unit dimensions, including the screen frame to pane separation to determine the proper screen frame to plastic sheet separation that will lead to the desired plastic sheet to pane separation, preferably to provide a "dead air" space of less than 0.75". Thus, when mounting the screen frame with an attached supplemental window unit, the perimeter closing material that is attached to the supplemental frame members may contact the inward facing jamb surfaces, the window frame or sash immediately adjacent the pane, and/or the pane.

Alternative attachment means to the pane may include an adhesive bearing tape such as double-sided tape, which may be applied as multiple alternating layers of adhesive and non-adhesive layers to enable providing a fresh adhering layer after dismounting, may be used to attach the supplemental window unit's spacing arrangement to the pane.

In another alternative attachment means, the supplemental window unit's spacing arrangement may be attached using a releasable, dry surface-adhesive device including, for example, an adhesive pad that may have a tether component attached, the adhesive pad including a planar backing layer having high in-plane stiffness and a planar layer of elastic material having an adhesive surface on at least one side for adhering to the pane, wherein the elastic material is impregnated onto the backing layer on at least the side opposing the adhesive surface, as described in WO 2012/078249, incorporated herein by reference in its entirety.

When using a releasable, surface-adhesive device, the elastic material preferably comprises a siloxane-based, such as polydimethylsiloxane, urethane-based, or acrylate-based elastomer. Such attachment by adhesive, vacuum or releasable, surface-adhesive device may be made to the interior or exterior surface of the pane. When using suction cups, attachment of the suction cup to the window pane may include use of an additional material between the suction cup and the pane. For example, water, saltwater, saliva, or other water based solution, such as liquid soap or dishwashing soap or solution may be used. Preferred materials include vegetable or cooking oil such as canola, sunflower or corn oil, petroleum jelly, or a grease, such as a petroleum or silicone grease based grease, e.g., polydimethylsiloxane.

Such preferred materials may also be useful for sealing the compressible insulating material to the window pane and/or the supplemental window frame. Also useful for aesthetic purposes, the perimeter of the window pane may first be covered with a thin opaque film, for example that matches the color of the window exterior when mounting is interior or vice versa, so that the supplemental window frame members and spacer and attachment means (if present) are not visible from the side of the window pane opposite the mounted supplemental window unit. Commercially available films such as Sihl EasyTack™ available from Sihl USA, Chesapeake, Va. or similar films may be useful for such applications and may be printed upon to more closely match the desired color and/or texture.

Figure 8A:
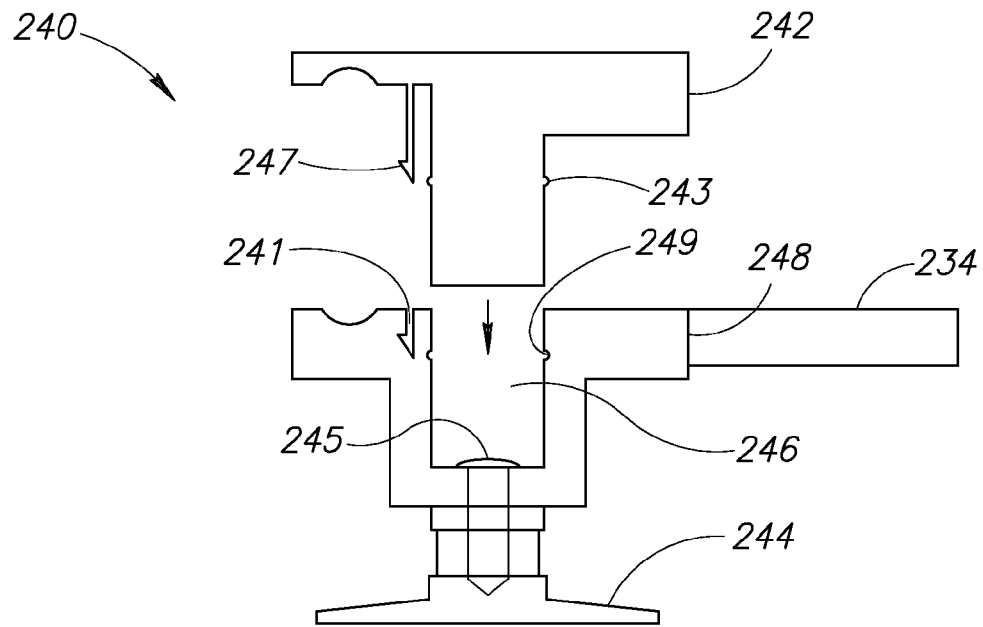
FIGS. 8A and 8B are diagrams illustrating a sectional view of an example suction cup mounting member of the frame of FIG. 6 in more detail.
Figure 8B:
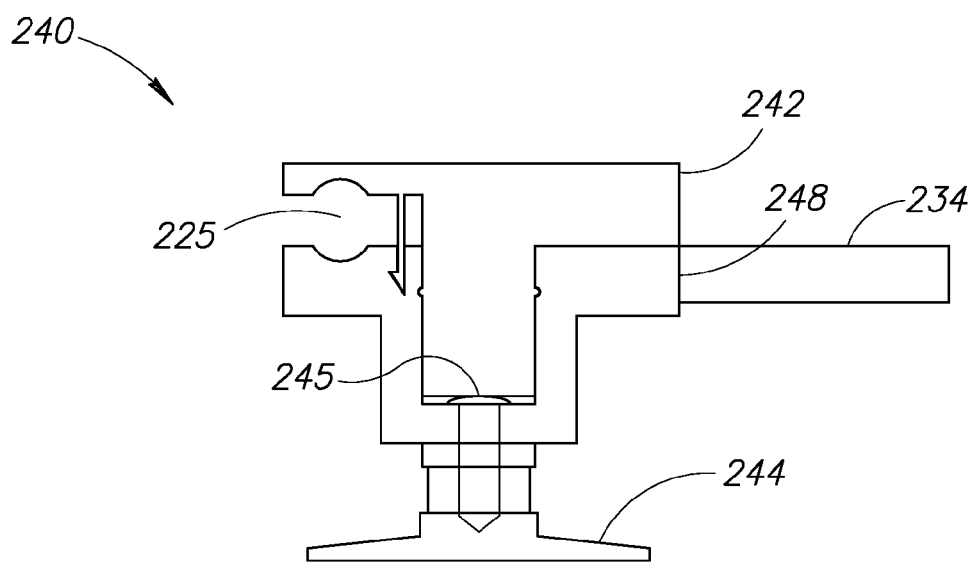

Attachment of suction cups to corner members may be accomplished by methods well known in the art. For example, the corner member may comprise a threaded post 173 (FIG. 4), 193 (FIG. 5) that screws into a pilot hole in the top portion 175 (FIG. 4), 195 (FIG. 5) of the suction cup. Alternatively, the corner member 248 (FIGS. 8A and 8B) may comprise a hole into which a mushroom head 245 on the suction cup 244 top may be secured, for example by providing a undercut cross-section that fits between the mushroom top and main body of the suction cup 244, as shown in FIGS. 8A and 8B. Attachment means other than a suction cup 244, for example those described FIGS. 9A and 9B, may also be used in the corner member configuration of FIGS. 8A and 8B.

In this embodiment, the corner member may comprise a single piece of material or it may comprise two portions such that a cap 242 is provided that snaps onto the main portion 248 of the corner member having corner projection 234. The cap may be formed such that when snapped onto the main portion of the corner member, a slot 225 (FIG. 8B) is formed for accepting the compressible insulating material. In addition, optionally compressible protrusions or ring 243 can be provided on cap 242 that mate with corresponding detent or ring 249 on the main portion 248. Alternatively or in addition, a barb or tab 247 may be provided on the cap 242 that fits into corresponding recess 241 on the main portion 248 to guide and/or secure the placement of the cap 242 over the main portion 248 of the corner member.

The space between the mushroom top and the corner member cap that seals the interior space 246 of the corner member may remain empty or, if provided with a communication path (not shown) to the dead air space, may be filled with a desiccant material. In each case, the post dimension perpendicular to the supplemental window unit plane is chosen so that, in combination with the attached compressed suction cup, it will provide the desired pre-determined spacing of the plastic sheet from the window pane.

Other embodiments of the present invention may provide predetermined spacing of the plastic sheet and window pane in which attachment means for mechanical support of the plastic sheet to the window occurs by contact with another window element, for example to a sash, stile, muntin or jamb. For example, when mechanical support is provided by outward pressure against the inward facing surfaces of the window frame such as jambs, the spacers may contact the window pane while being attached to the plastic sheet by methods described above. Alternatively, the predetermined spacing may be provided by, for example muntins and, optionally, a spacer between the supplemental frame or plastic sheet and muntin. In this case, the supplemental window frame may optionally be attached to one or more muntins.

In another embodiment mechanical support is provided using a spring loaded insert attached to a supplemental window frame member, such that the insert end of the spring provides force at a notch, slot or groove at the interior window pane to sash interface, as is well-known in the art for mounting removable muntins to the interior side of window panes. Such attachment in the present invention may be made at corner or at edge points of the interior window pane to sash/stile interface.

Figure 9A:
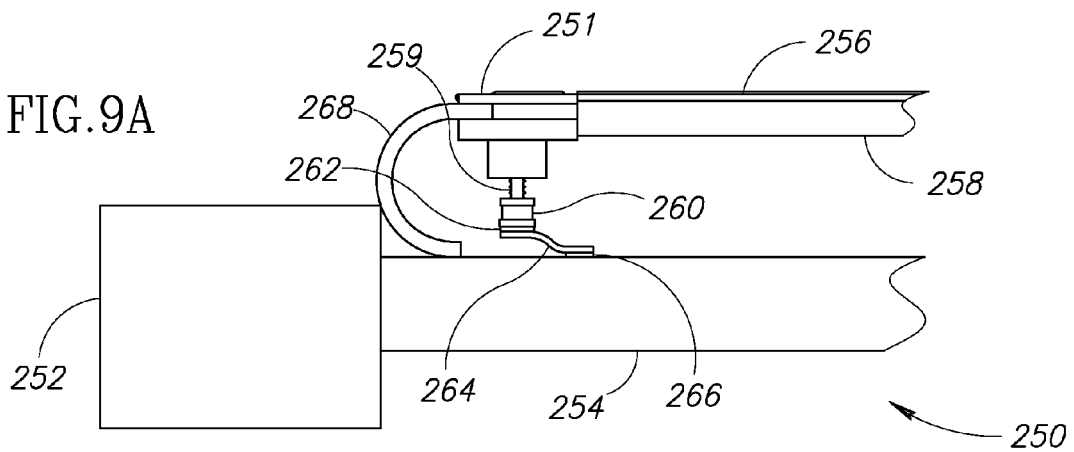
FIG. 9A is a diagram illustrating a first example mechanism for mounting the supplemental window frame to the existing window.

A diagram illustrating a first example mechanism for mounting the supplemental window frame to the existing window is shown in FIG. 9A. The sectional view of the supplemental window assembly, generally referenced 250, comprises corner member 258, side frame member 256, top portion 251 of the corner member 258, seal 268, threaded post 259, an attachment mechanism comprising post receptacle 260, adhesive or other well-known fastening mechanism 262, tether or tendon 264, dry adhesive pad (i.e. T-pad) 266, window pane 254 and window sash 252.

Figure 9B:
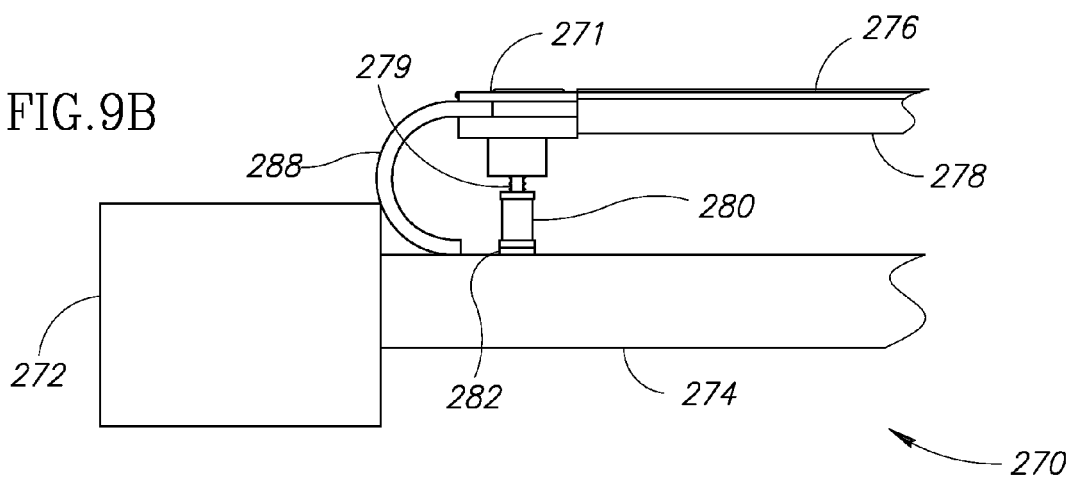
FIG. 9B is a diagram illustrating a second example mechanism for mounting the supplemental window frame to the existing window.

A diagram illustrating a second example mechanism for mounting the supplemental window frame to the existing window is shown in FIG. 9B. The sectional view of the supplemental window assembly, generally referenced 270, comprises corner member 278, side frame member 276, top portion 271 of the corner member 278, seal 288, threaded post 279, an attachment mechanism comprising post receptacle 280, adhesive or other well-known fastening mechanism 282, window pane 274 and window sash 272.

Figure 9C:
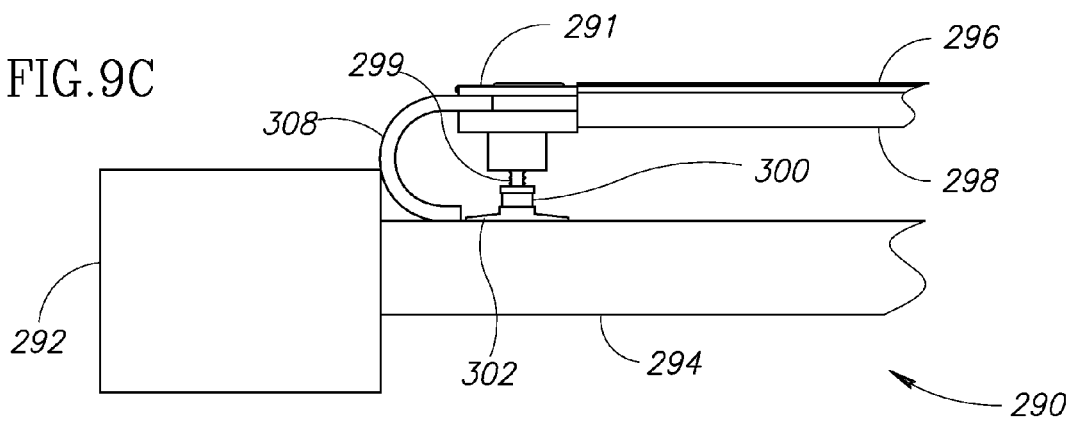
FIG. 9C is a diagram illustrating a third example mechanism for mounting the supplemental window frame to the existing window.

A diagram illustrating a third example mechanism for mounting the supplemental window frame to the existing window is shown in FIG. 9C. The sectional view of the supplemental window assembly, generally referenced 290, comprises corner member 298, side frame member 296, top portion 291 of the corner member 298, seal 308, threaded post 299, an attachment mechanism comprising suction cup 302, window pane 294 and window sash 292.

Figure 10A:
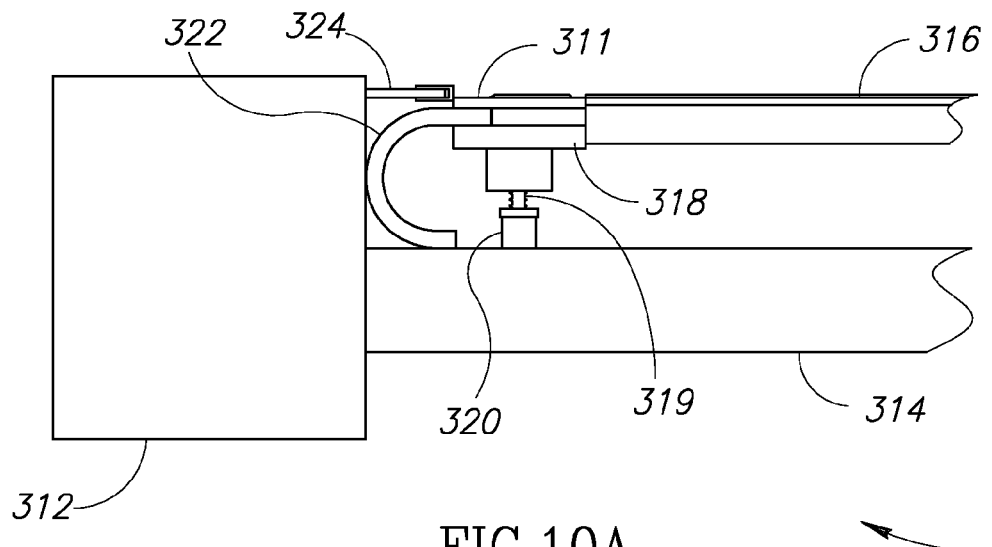
FIG. 10A is a diagram illustrating a first example mechanism for providing separate spacer, sealing and outward pressure functions.

A diagram illustrating a first example mechanism for providing separate spacer, sealing and outward pressure functions is shown in FIG. 10A. The sectional view of the supplemental window assembly, generally referenced 310, comprises corner member 318, side frame member 316, top portion support 311 of the corner member 318, seal 322, threaded post 319, spacer 320, window pane 314, window sash 312 and compressible material (e.g., closed cell foam, etc.) 324. In this embodiment, the functions of (1) optimally spacing the plastic sheet from the window pane, (2) sealing and (3) holding the supplemental window in place on the window are performed by three separate elements of the invention. The spacing function is performed by the spacer 320, threaded post 319 and corner member 318, the sealing function is performed by the seal 322 and the holding function is performed by the compressible material 324 which is operative to apply outward pressure to the inward facing walls of the window sash or frame.

Figure 10B:
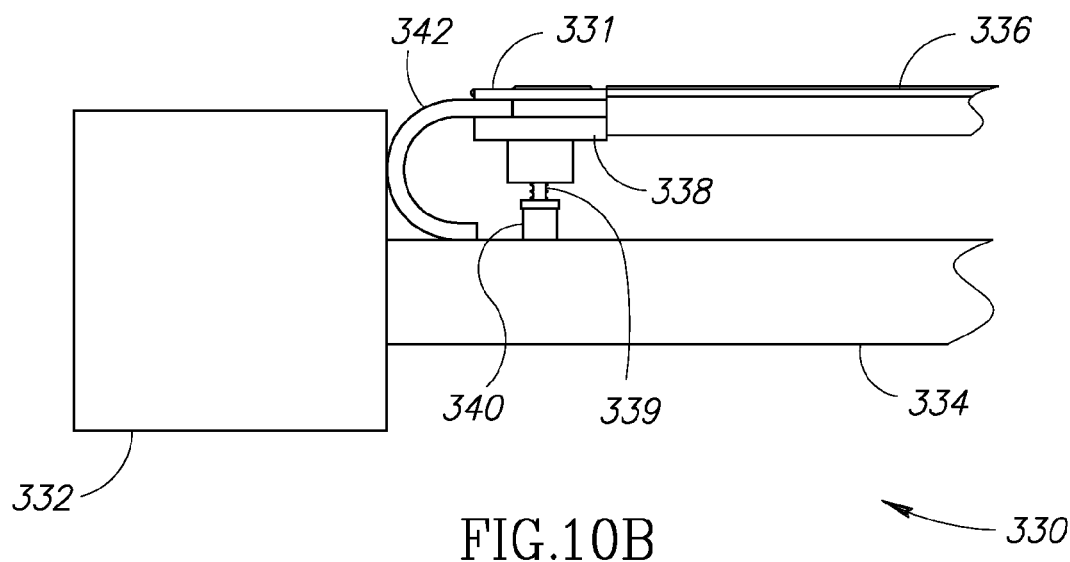
FIG. 10B is a diagram illustrating a first example mechanism for providing spacer and combined sealing and outward pressure functions.

A diagram illustrating a first example mechanism for providing spacer and combined sealing and outward pressure functions is shown in FIG. 10B. The sectional view of the supplemental window assembly, generally referenced 330, comprises corner member 338, side frame member 336, top portion support 331 of the corner member 338, seal 342, threaded post 339, spacer 340, window pane 334 and window sash 332. In this embodiment, the functions of (1) optimally spacing the plastic sheet from the window pane, (2) sealing and (3) holding the supplemental window in place on the window are performed by two separate elements of the invention. The spacing function is performed by the spacer 340, threaded post 339 and corner member 338, while both the sealing and the holding functions are performed by the seal 342 which is operative to apply outward pressure to the inner walls of the window sash or frame as well as trap the gas layer between the window pane and the plastic sheet.

Figure 11:
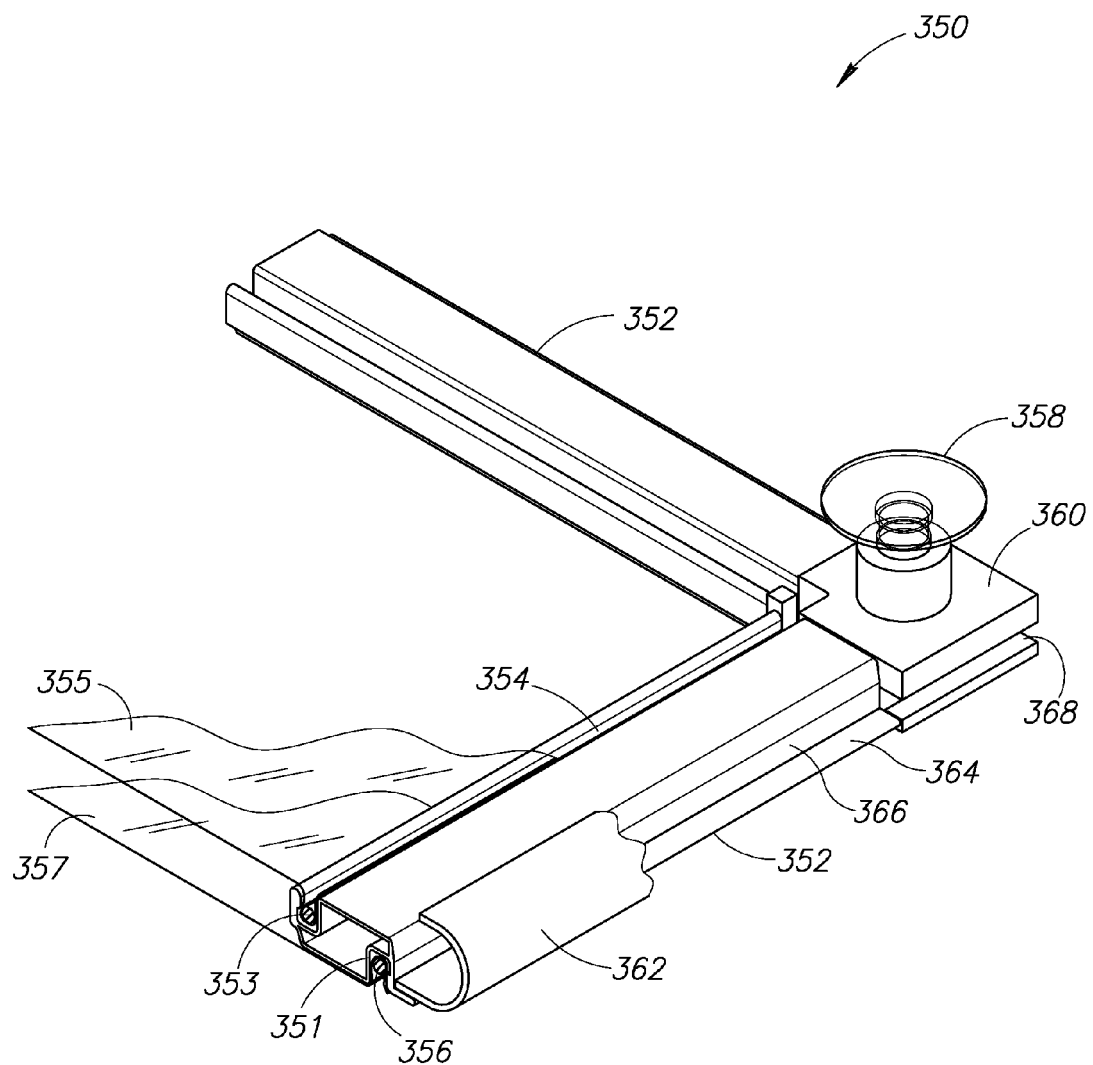
FIG. 11 is a diagram illustrating a corner section of an example frame portion having two splines in side and corner members.

In an alternative embodiment, a second plastic sheet is adhered or otherwise held in place, such as with a second groove/spline arrangement or with adhesive, to the supplemental window frame to form a second "dead air" space with the supplemental window frame and/or compressible insulating material forming the enclosed perimeter of the second space. A diagram illustrating a corner section of an example custom supplemental frame member portion having two splines in side and corner member is shown in FIG. 11. The frame portion, generally referenced 350, comprises corner member 360 with groove 368 and suction cup 358, side members 352 each having a first groove 354 and second groove 356 for first plastic sheet 355 and second plastic sheet 357, respectively. Note that the slot in the corner member may or may not have a recess. Slot 368 in corner member 360 in FIG. 11 does not have a recess while groove 225 in corner member 220 in FIG. 6 does have a recess. Plastic sheets 355, 357 are held in their respective grooves 354, 356 via splines 353, 351, respectively. Splines 351 and 353 may extend into grooves (not shown) in corner member 360 (on the side opposite suction cup 358) that are substantially aligned with groove 356 for holding plastic sheet 357 at corner member 360. Preferably for this embodiment, the supplemental window frame members and holding means for the second plastic sheet 357 are dimensioned to provide spacing between the plastic sheets in the range of approximately 0.15 inch to about 0.75 inch. Additional plastic sheets and "dead air" spaces may be applied in a similar manner, e.g., three or more plastic sheets. In such an embodiment, the sides of the space between the window pane and the supplemental window frame may be closed using a compressible insulating material 362, such as foam sheet, comprised for example of a closed cell polymer foam as described supra which is held in place abutted to surfaces 364, 366 on frame members 352.

While the examples of groove and spline supports show the groove to be exterior to the spline, the positions of these support pieces may be interchanged. For example, spline/groove 356 may be placed on the same side of the frame member as the first spline/groove 354. This alternative embodiment may be aesthetically better looking as the second spline/groove is hidden from view behind the frame as is the first spline/groove.

While embodiments are described as supplemental parts to be added to windows, those skilled in the art will appreciate that these embodiments, or the supplemental window parts thereof, may also be provided as integral parts of enhanced new or replacement windows. For example, groove or spline elements may be molded as part of a window sash or frame during the manufacture of the window unit such that the spacing arrangement of a plastic sheet from the pane is at a preferred location when the plastic sheet is attached directly to the sash or frame, which may be accomplished with or without supplemental spacing parts that attach to the window pane. Such elements molded as part of the window sash or frame may be located to the interior or exterior of the pane to allow for preferred placement of the plastic sheet depending upon the environmental conditions. Also, the closed cell polymer foam perimeter may be omitted in cases where the window framing inward facing surface has slots, such as those found with some fixed window frames, into which the plastic sheet can be fit. In such cases, the plastic sheet dimensions may be larger than the window pane so that the plastic sheet may slide into such slots while the plastic sheet over the window pane is kept substantially at the preferred distance from the pane by attaching to corner members, optionally as part of a supplemental window frame, described above.

For very large windows, such as picture or bay windows, whose smallest dimension may exceed the dimensions available for plastic sheeting, the fenestration area may be subdivided by providing custom supplemental muntins or mullions providing spacing between the plastic sheet and window and providing more than one plastic sheet to cover the entire window area.

In another embodiment, auxiliary parts are provided which may comprise, for example, infiltration blocking means, aesthetic enhancing means or means for inhibiting air flow interior to the supplemental window unit or supplemental window frame. A diagram illustrating a front view of a third example window incorporating an infiltration blocking mechanism is shown in FIG. 12A.

The window, generally referenced 90, comprises the infiltration blocking portion 92 of the auxiliary part, lower window frame 93, portion 94 of the infiltration blocking auxiliary part provides an offset from the supplemental window frame member and window sill 98.

Figure 12A:
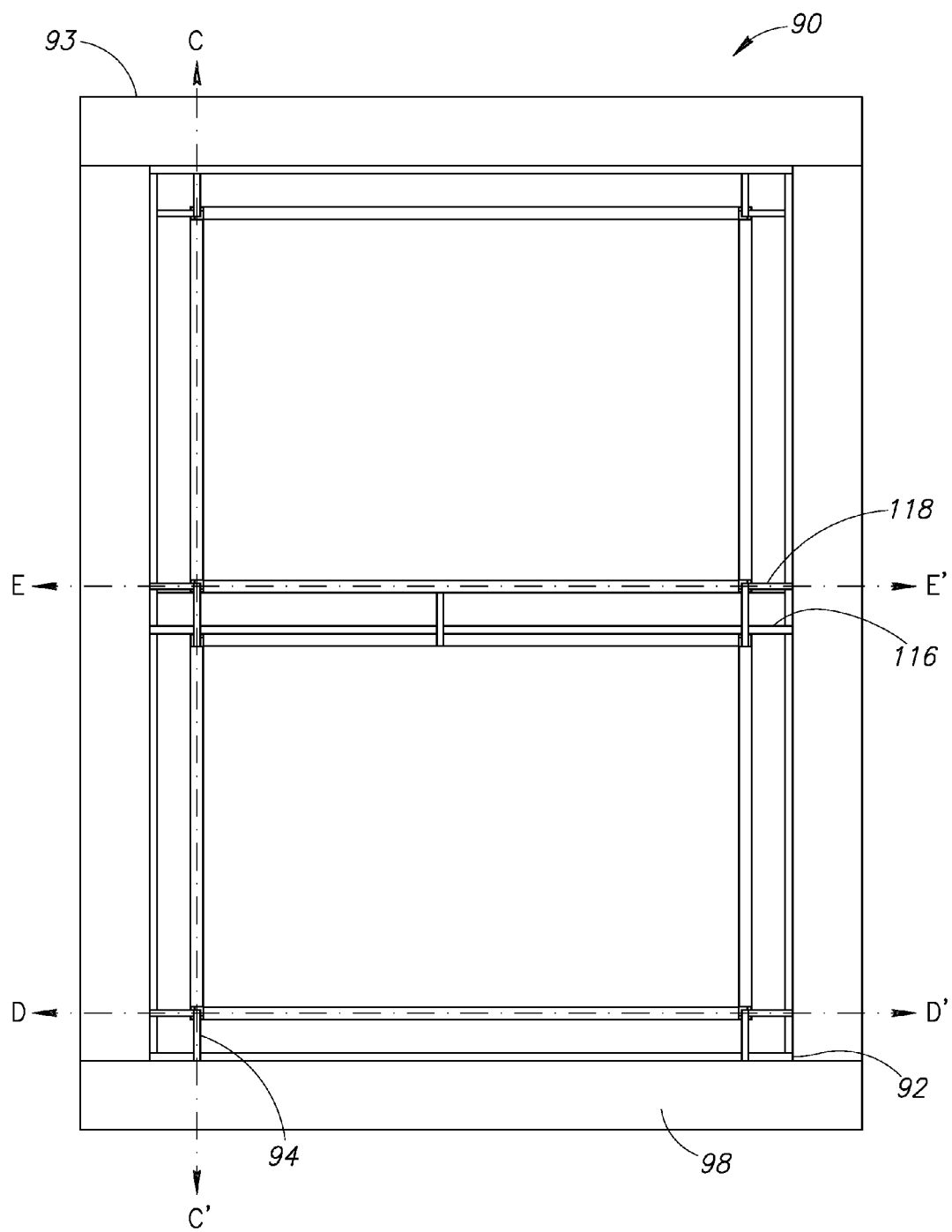
FIG. 12A is a diagram illustrating a front view of a third example window incorporating an infiltration blocking mechanism.
Figure 12B:
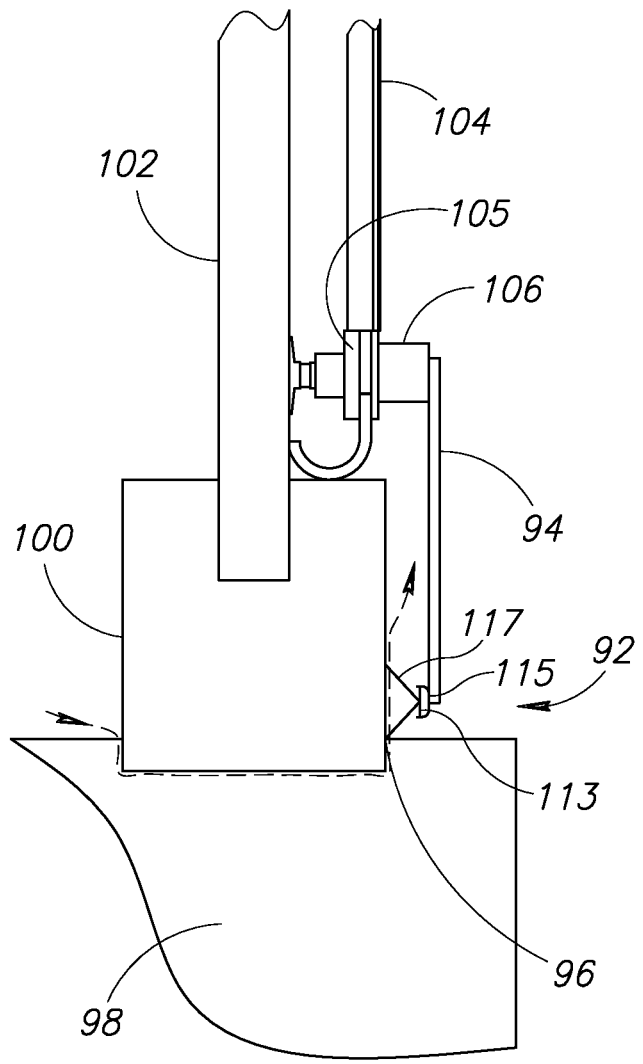
FIG. 12B is a diagram illustrating a side sectional view C-C' at D-D' of the example window of FIG. 12A.
Figure 12C:
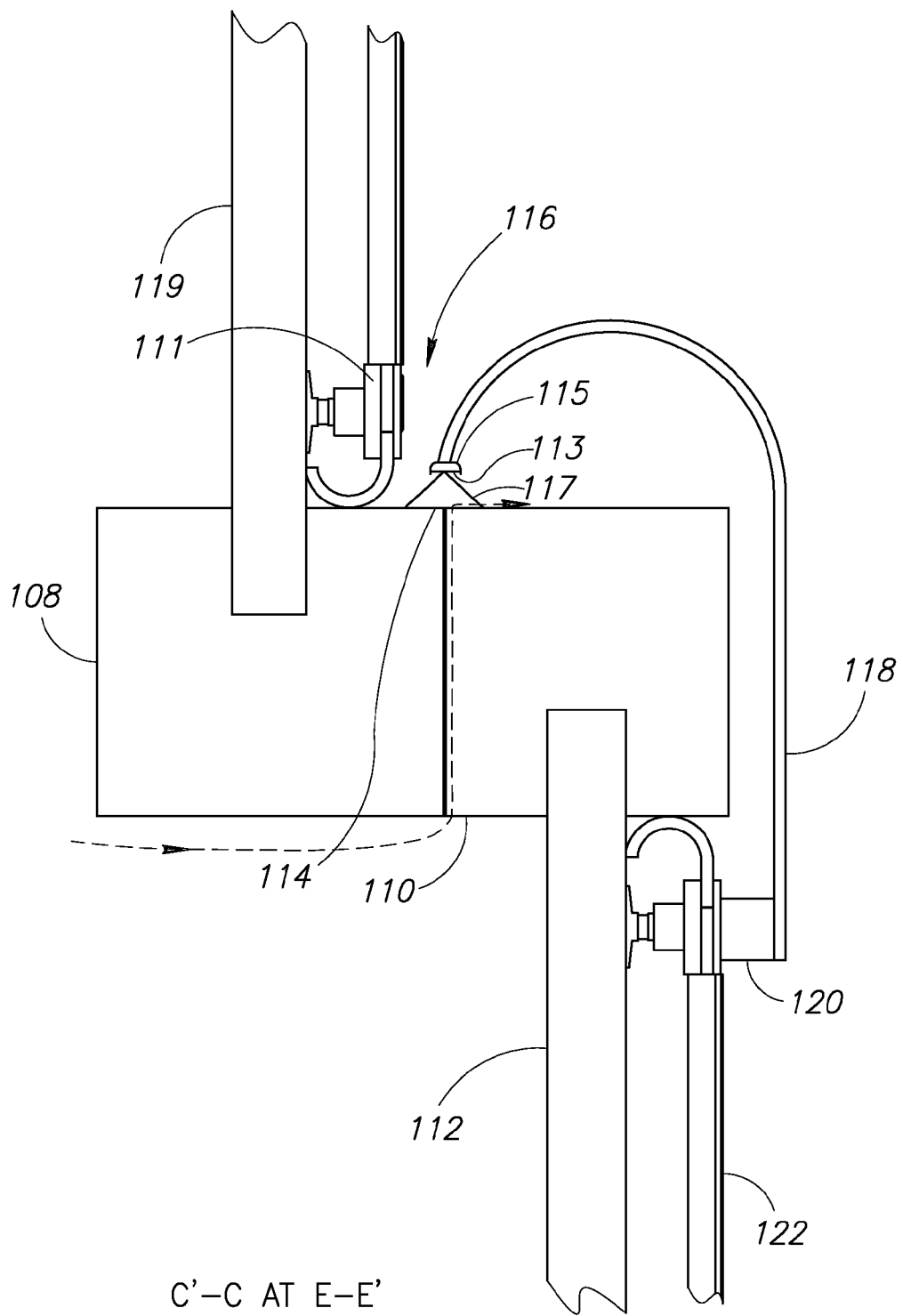
FIG. 12C is a diagram illustrating a side sectional view C-C' at E-E' of the example window of FIG. 12A.

Infiltration blocking refers to inhibiting air infiltration at sealing interfaces of windows that are not fixed, such as hung, sliding, casement or awning windows, as shown in FIGS. 12A, 12B and 12C for vertical sliding or hung windows. Auxiliary parts for air infiltration blocking may be custom made to provide blocking at a particular sealing interface. A diagram illustrating a side sectional view C-C' at D-D' of the example window of FIG. 12A is shown in FIG. 12B. In one embodiment, an auxiliary part may comprise attachment means 106 such as a clip, screw or adhesive that attaches the auxiliary part to the corner member 105 or supplemental window frame member 104 edge as shown in FIG. 12B. A portion 94 of the infiltration blocking auxiliary part provides an offset from the supplemental window frame member or corner member attachment to the sealing interface 96. At the other end of the auxiliary part may be another clip or adhesive mechanism that holds the infiltration blocking portion 92 of the auxiliary part. The infiltration blocking portion may be a strip of pile, foam, felt or other, preferably conformable, insulating material that is offset from the supplemental window frame such that it covers and preferably contacts the sealing interface opening on the same side of the window as the frame member. The infiltration blocking portion may optionally enter the sealing interface or it may surround the sealing interface by contacting window component surfaces on each side of the sealing interface. Vertically oriented sealing interfaces may be blocked using a similar arrangement rotated by ninety degrees.

A diagram illustrating a side sectional view C-C' at E-E' of the example window of FIG. 12A is shown in FIG. 12C. In another embodiment, an auxiliary part may comprise attachment means 120 such as a clip, screw or adhesive that attaches the auxiliary part to the corner member 111 or supplemental window frame side member 122 as shown in FIG. 12C. A portion 118 of the infiltration blocking auxiliary part provides an offset from the supplemental window frame member or corner member attachment to the sealing interface 114. At the other end of the auxiliary part may be another clip or adhesive mechanism that holds the infiltration blocking portion 116 of the auxiliary part. The infiltration blocking portion 117 may be a strip of pile, foam, felt or other insulating material that is offset from the supplemental window frame such that it covers and preferably contacts the sealing interface 114 opening on the same side of the window as the frame member. The infiltration blocking portion may optionally enter the sealing interface or it may surround the sealing interface by contacting window component surfaces on each side of the sealing interface, e.g., upper window sash rail 108, window pane 119, lower window sash rail 110. It will be appreciated by those skilled in the art that infiltration blocking of sealing interface at the check rail described supra may alternatively be accomplished by auxiliary parts attached to frame members of the supplemental frame unit at the bottom of the top sash. In such an embodiment, portion 118 may bend approximately 90 degrees to the exterior toward sealing interface 114 such that the infiltration blocking portion is held at the check rail sealing interface.

The strip of insulating material, such as pile fibers 117 (FIG. 12C), may be held by a solid continuous base 113 such that the insulating material and base extend the length of the sealing interface. The base may be held in a C-channel 115, as shown in FIG. 12C, at one or more points along its length which may optionally allow for movement of the base parallel to the sealing interface. In FIG. 12A, the base is shown to be held at two points along each length, one point near each corner. The C-channels, either attached to the rod 94 or integral to the rod 94, holding the base are at the end of offset rods that attach to a supplement window frame member, such as the corner members as shown in FIG. 4A. Attachment of the offset rods to a supplemental window frame member may be accomplished by means known in the art. As a non-limiting example, the rod may have a clearance slot through which a bolt may be used to clamp the rod to the corner member, the bolt being perpendicular to the plane of the supplemental window frame plane and the slot allowing for adjustment of the pile position perpendicular to the sealing interface by movement parallel to the supplemental window frame plane.

The bolt may be held by threads in a tapped hole in the corner member or in attachment means 106, 120 that is attached to the corner member in FIG. 4A.

Figure 13A:
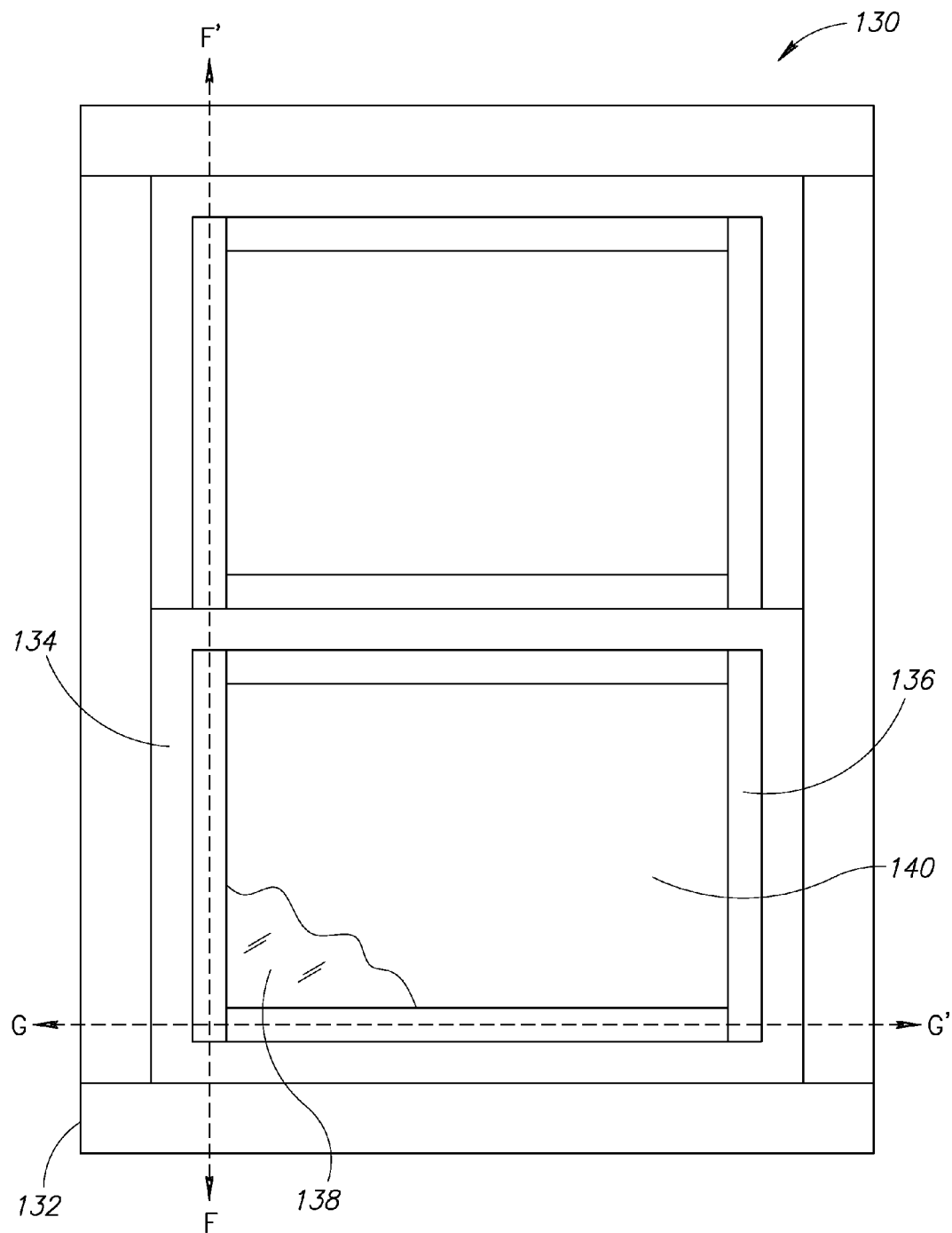
FIG. 13A is a diagram illustrating a front view of a fourth example window incorporating additional aesthetic enhancing parts.
Figure 13B:
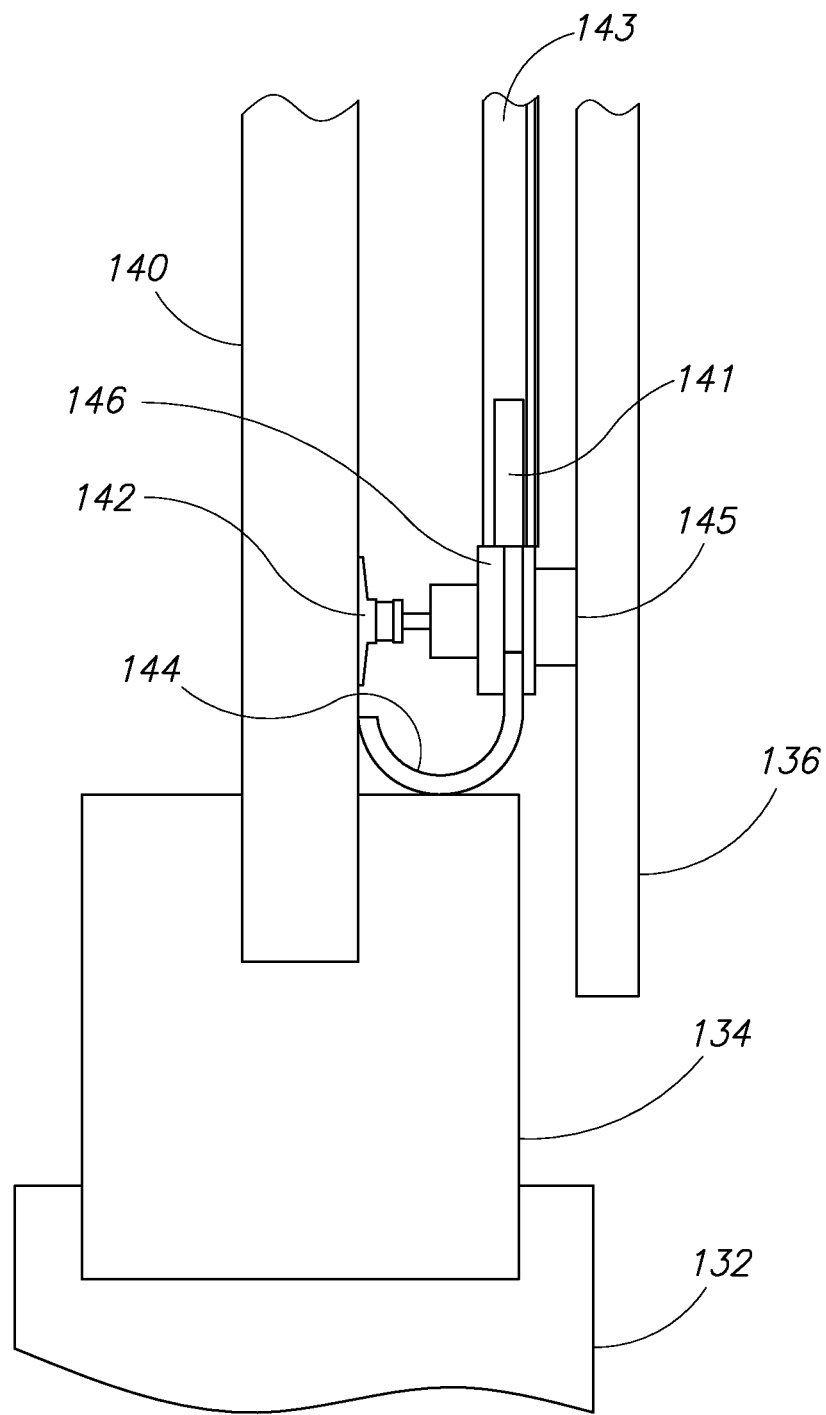
FIG. 13B is a diagram illustrating a side sectional view F-F' at G-G' of the example window of FIG. 13A.

A diagram illustrating a front view of a fourth example window incorporating additional aesthetic enhancing parts is shown in FIG. 13A. A diagram illustrating a side sectional view F-F' at G-G' of the example window of FIG. 13A is shown in FIG. 13B. The window, generally referenced 130, comprises window frame 132, sash 134, aesthetic enhancing parts 136, plastic sheet 138, window pane 140, attachment means (e.g., suction cup 142), seal 144, side frame member 143, corner projection 141 and attachment means 145.

The aesthetic enhancing parts 136 that cover the supplemental window frame to provide, for example, the same or similar color as the sash or frame surrounding the pane to which the supplemental window unit is attached. The aesthetic enhancing parts 136 are fastened to the frame via attachment post 145 using any suitable means, such as using adhesive or mechanical means to attach the aesthetic enhancing parts to the frame corner members 146. The aesthetic enhancing parts may be configured to hide the seal 144 and attachment mechanism 142 from view.

Also shown in FIG. 13B are the window sill 132, window sash rail 134, seal 144, window pane 140, attachment mechanism 142 (e.g., suction cup in this example) and aesthetic enhancing part 136.

Figure 14A:
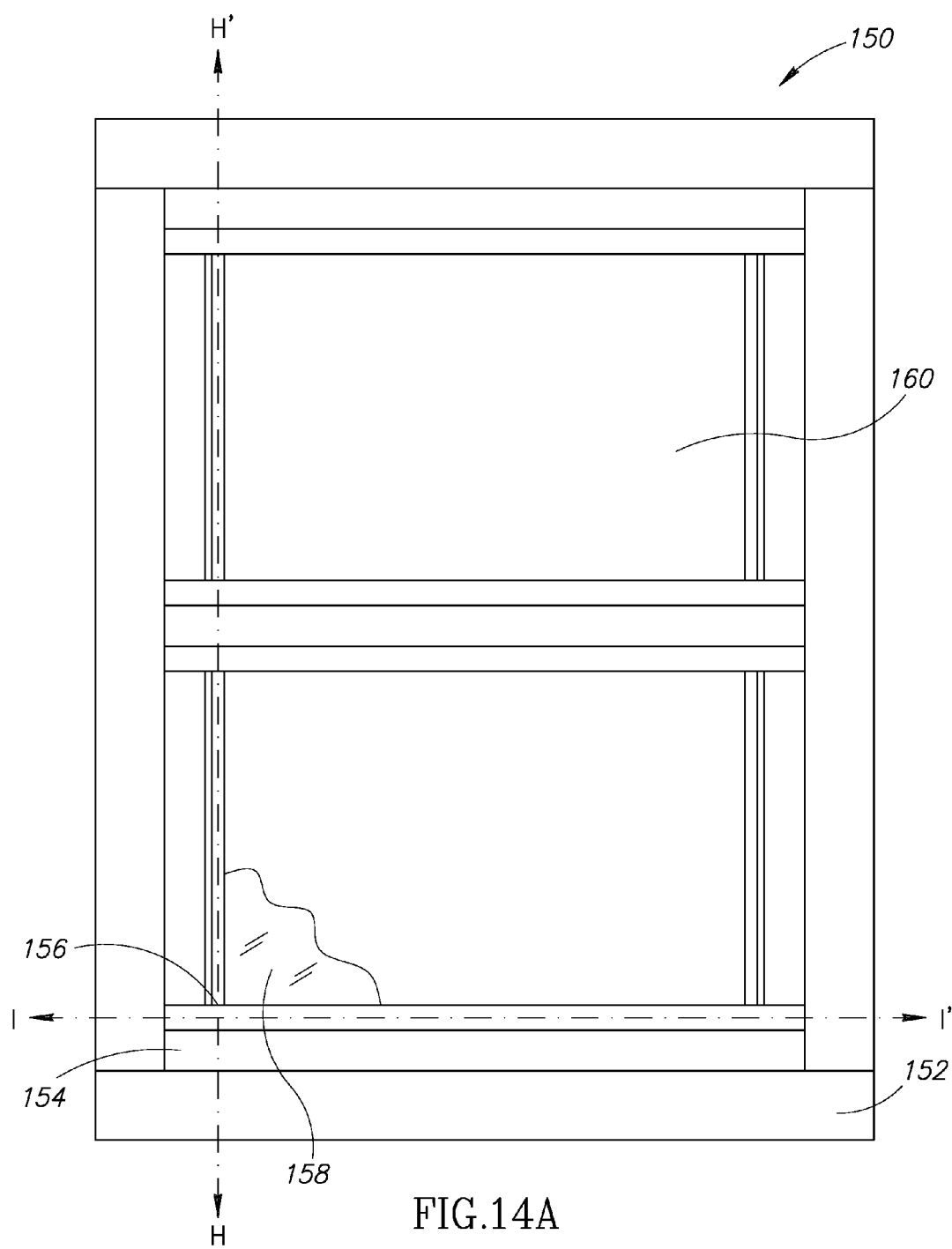
FIG. 14A is a diagram illustrating a front view of a fifth example window incorporating a mechanism for inhibiting air flow interior to the supplemental window.
Figure 14B:
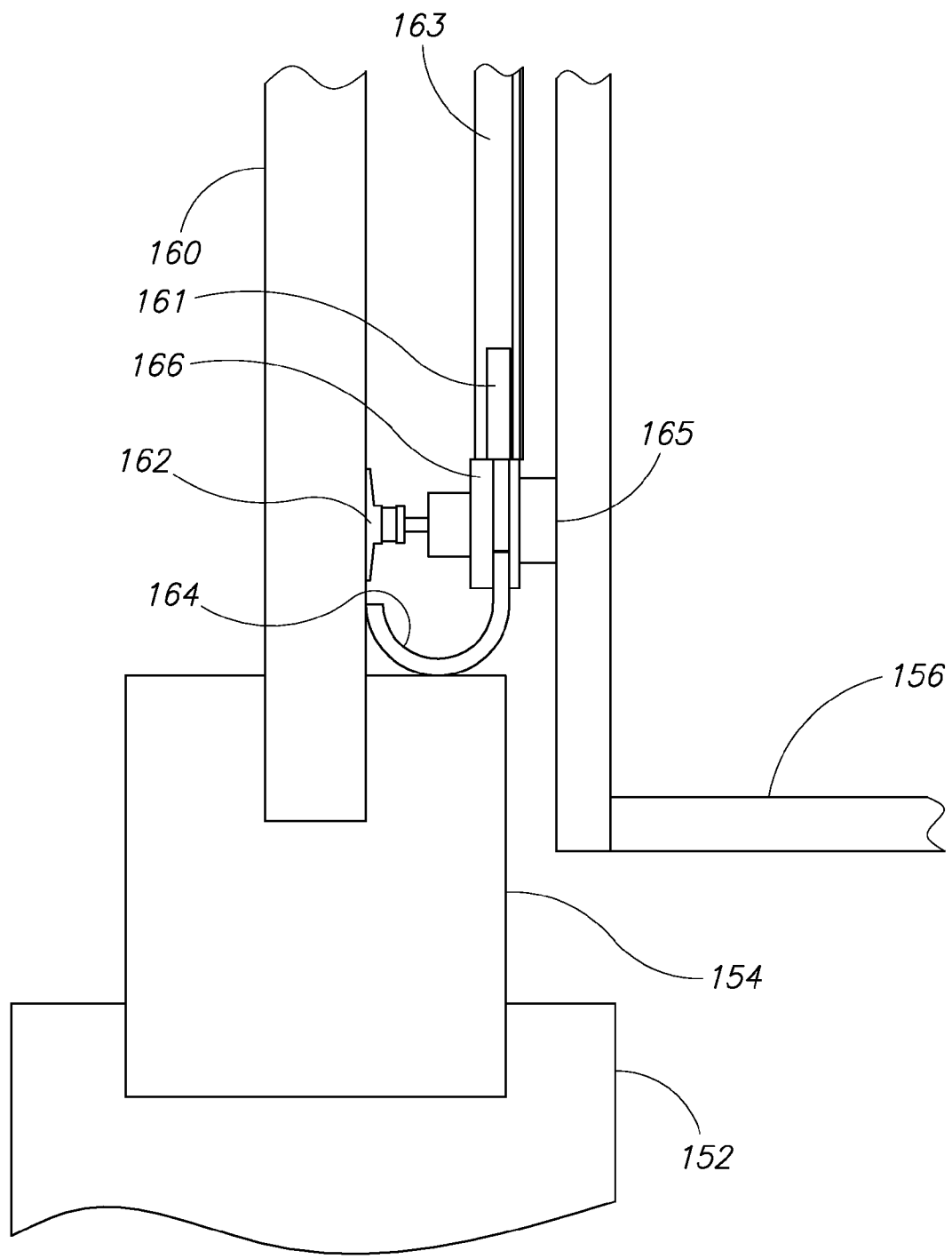
FIG. 14B is a diagram illustrating a side sectional view H-H' at I-I' of the example window of FIG. 14A.

A diagram illustrating a front view of a fifth example window incorporating a mechanism for inhibiting air flow interior to the supplemental window is shown in FIG. 14A. A diagram illustrating a side sectional view H-H' at I-I' of the example window of FIG. 14A is shown in FIG. 14B. The auxiliary part shown in FIGS. 14A and 14B may comprise a substantially planar part 156, oriented substantially perpendicular to the supplemental window unit plane toward the room interior to inhibit convective air flow parallel to the window near the plastic sheet between the plastic sheet and a closed window treatment (e.g., drapes or blinds) associated with the window.

The window, generally referenced 150, comprises window frame 152, window sash 154, plastic sheet 158, window pane 160 and air flow inhibitor member 156. Also shown in FIG. 14B are the window frame 152, window sash 154, window pane 160, seal 164, attachment mechanism 162 (e.g., suction cup in this example), attachment means 165, air flow inhibitor member 156, corner member 166, side frame member 163 and corner projection 161.

The supplemental window frame corner members may optionally have means for providing tension adjustment of the sheet or for providing attachment means to mount auxiliary parts. Tension adjustment means may include a direct screw adjustment or a screw activated cam adjustment means to lengthen one or both frame edge dimensions that intersect at the corner after the sheet has been attached to the frame. Such tension adjustment means may be similar to that described in U.S. Pat. Nos. 7,228,662 and 7,818,927, incorporated herein by reference in their entirely, except that the adjustment means is contained in the frame corner member and provides a force that slightly separates the frame edge from the frame corner member.

Supplemental window frame parts for the plastic sheet material may be fabricated in several ways. When mounting is to be achieved with a groove and spline configuration, the groove and spline may be fabricated by a molding process, such as extrusion or roll molding, or three-dimensional printing methods. The spline may alternatively be a flexible polymer or rubber tube or rope that may be pressed into to groove as is known in the art. If molded, the groove and spline may be chopped or cut using methods well-known in the art to an appropriate length for stable and snug fit based on the side enclosing sheet dimension, plastic sheet to pane spacing and the measured dimension provided.

Corner members can be fabricated, for example, by injection molding or three-dimensional printing methods. As part of extrusion, injection molding or 3D printing operations, printing, embossing or other means of part identification, material type and recyclability, installation instructions and mating indicators may be imparted on each such part. Other aspects of fabrication may include the chopping, cutting or slitting of weatherstrip materials, application of adhesives and associated protective covers for applied adhesives and packaging material. Attachment of the plastic sheet or perimeter enclosing material to a custom supplemental support part during fabrication may be performed to minimize installation complexity. Such attachment may be by adhesive, welding, heat sealing or, fit into a channel of the custom supplemental support part to aid in end-of-life recycling or re-use of the materials.

When an end user no longer wishes to use the custom supplemental parts, for example due to moving to a different location, the custom supplemental parts may be recycled or re-used by a subsequent occupant at the location of the installation. When recycling the custom supplemental parts, such recycling may be achieved by the end user through a local recycling program, sent to a local retailer for recycling or sent to the service provider for recycling. When sent to the service provider for recycling, the custom supplemental parts may also be resold, with refurbishment or remanufacturing if necessary, to a different end user having similar, though perhaps slightly different, design requirements as the original end user. For example, the shape of a plastic sheet might be altered slightly by cutting along an edge while the support means are re-used without modification.

Alternatively, the service provider may separate the custom supplemental parts from multiple end users so that such parts may be recombined in different combinations to meet the design requirements of a new end user. Another recycling route that may be used by the service provider or fabricator is to have the received parts enter a recycling stream in which the parts re-enter a manufacturing stream at a raw material stage where they are reformed into a new shape or part. The materials used for supplemental window frame parts or the plastic sheet may be chosen to optimize certain characteristics, depending on the part and end user design choices. It is preferred that the materials used for each part are chosen so that each part may be reused, recycled or remanufactured.

For use as corner, groove or spline parts, materials having sufficient stiffness to maintain sealing against the sealing surface while providing mechanical stability is desirable. Because the custom supplemental parts may be exposed to sunlight for extended periods, ultraviolet stabilizers may be added to the materials to maintain optical and mechanical properties. Suitable materials for the plastic sheet include flexible glass, polyethylene terephthalate, polyethylene terephthalate glycol-modified, acrylic such as polymethylmethacrylate, polyvinyl chloride, cellulose acetate, or polycarbonate.

Suitable materials for the supplemental window frame members include polyethylenes, such as high density polyethylene, low density or linear low density polyethylene, polypropylene, polyvinyl chloride, nylon, acrylonitrile-butadiene-styrene, polystyrene, rubber modified polystyrene, polyurethane, polylactic acid, polycarbonate or composite blends of natural fibers, such as cellulose, wood flour, rice hulls, bamboo, or flax, with recycled or virgin plastic resins and such composite blends that contain melt processable moisture scavengers. When using polycarbonate based materials in the present invention, those polycarbonate materials derived from the reaction of carbon dioxide with, for example, epoxides, may be preferred to minimize the carbon footprint of the materials used in the invention. Aluminum is also a suitable material for the supplemental window frame profile members, particularly when bowing must be minimized such as when long dimensions are required.

The supplemental window frame member profile material may comprise a metal such as aluminum, for example, extruded or roll formed aluminum profile. Alternatively, to provide a less thermally conductive mounting support assembly, the supplemental window frame member material may be a polymer plastic which may be an extruded plastic profile. Plastic materials that may be useful for the supplemental window frame member profile may include vinyl, such as polyvinyl chloride or acrylic, polyethylene, polypropylene, or polycarbonate. When polycarbonate is used, polycarbonates may include those that are made by reacting carbon dioxide with organic compounds such as epoxides.

For use as plastic sheet held in a groove and spline, materials that are also flexible and easily folded are preferred. For example, polyethylene terephthalate may be used in a thickness range of approximately 0.001 to about 0.003 inch to provide for the proper balance of non-creasing and non-tearing at the corners particularly when the groove is oriented perpendicular to the plane of the plastic sheet. If transparency of the window opening is desired, materials having relatively high transparency, clarity and gloss as well as low haze are useful in the present invention.

Additionally, the plastic sheet may comprise other materials dispersed within it or in the form of layers. For example, a plastic sheet comprising other materials is particularly useful when emissivity, transmittance, absorptance and/or reflectance control is desired. One type of such material may be the addition of a laminate, for example a multilayer laminate comprising an infrared reflective layer and a scratch resistant layer such as those found in currently available window films. Such films may include materials such as transparent plastic that has been metalized or dyed, or may comprise ceramic (inorganic oxides such as tin oxide or indium oxide, or metal hexaboride or metal nitride or metal oxynitride or metal silicide, preferably less than 200 nm in diameter, more preferably less than 100 nm in diameter) film laminates that are applied as a thin layer to transparent sheets. Such materials may also act as a filter for reflecting most ultraviolet and/or infrared wavelengths while allowing transmission of visible light.

Alternatively, the plastic sheet may comprise materials that control the visible light transmitted for effecting privacy purposes. When using emissivity or reflectivity control layers or treatments, the sheet may be mounted on the interior or exterior side of the window pane to provide the surface treatment location that provides optimal energy savings. For example, during cold weather seasons, mounting a low-e or infrared reflective material to the interior of the pane is preferred, while during hot weather seasons it is preferable to mount the low-e or infrared reflective material to the exterior of the pane.

The plastic sheet may also have printing on the portion through which the window pane is visible. Such printing may include logos, decals or figures for desired aesthetic purposes, or line patterns, such as those used to inhibit bird strikes on the window. For plastic sheet parts, mechanical, optical and thermal conduction properties of the sheet may be optimized in different ways depending upon the end user product choices. For cases in which the sheet is fit into a groove and spline configuration, the plastic preferably has mechanical properties allowing it to have a small radius of curvature without fracturing. At the same time, having a coefficient of friction that allows for both holding the plastic sheet in place and adjustment by the end user with the plastic sheet mounted is desirable. When used to the exterior of the original window, high impact resistance may be desirable.

While the embodiments described have focused on fenestration related objects, it will be appreciated that the present invention may be used for designing and fabricating custom supplemental parts for other objects. For example, similar "dead air" spaces may be formed when using a door or wall as one side of the "dead air" space in the present invention. In addition, original or replacement windows with associated framing may be designed and fabricated based on the method of the present invention where the adjustable dimensions are made adjustable by the thickness of materials surrounding the supplemental frame.

As a first example, consider a double pane argon filled, low-e awning window (Andersen Perma-Shield). The window is covered with a polyethylene terephthalate sheet (Grafix Duralar, 0.003" thickness). The supplemental window unit is constructed with four PVC corner members which are shown in FIG. 6, wherein each of which has a 0.75 inch diameter PVC suction cup (Mini Cup available from Adams Manufacturing, Portersville, Pa., with 3/32" Top Pilot Hole). Attachment of the suction cup to the window pane is aided by applying a thin layer of Dow Corning High Vacuum Grease (which contains polydimethylsiloxane, amorphous silica and hydroxyl-terminated dimethyl siloxane) to the suction cup sealing surface.

The spacing from the window pane to the bottom surface of each corner member is approximately 0.625 inch. Material from the PET sheet is removed from each corner so that the sheet can be adhered to the bottom surface of each corner member using double sided tape. A CeilingMax Top Hanger, available from Acoustic Ceiling Products LLC, Appleton, Wis., with ends modified to accommodate and attach to the corner members, can be used for the supplemental window frame sides and attached with nylon bolts and nuts to the arms of the corner members to create the supplemental window frame. Dow Corning Window Sill Seal closed cell polyethylene is used as the compressible insulating material for enclosing the perimeter. The closed cell polyethylene is cut to a single 3.25 inch strip into which triangular notches are cut so that mitered corners were formed when placed around the supplemental window frame. The shape of the closed cell polyethylene is as shown in FIG. 4 with the closed cell polyethylene held between the supplemental window frame members and the window pane.

Using the method described of K. Varshney et. al, described in Intern. J. Green Energy, 9:1-17, 2012, using an Omega infrared thermometer (Model OS685U), first allowed to equilibrate to indoor and outdoor temperatures for at least 20 minutes before each window surface temperature measurement, lower corner U-Factors of approximately 0.15-0.20 were obtained with the sheet covering the window and 0.27 without any additional window covering. Consider a second example mounted and measurements taken as described for the first example described supra, except that the plastic sheet (Grafix Duralar 0.002 inch thickness) is held in the exterior facing outward groove of a supplemental window frame with sides made from Screen Tight 1.5 inch Porch Screening System Base Strip using a vinyl screen retaining spline (New York Wire) and the closed cell polyethylene pressure fit into the inward groove of the Base Strip.

The dimension of the closed cell polyethylene strip perpendicular to the window pane is sized to 1.5 inches to provide perimeter enclosing as shown in FIG. 4 and the Base Strip modified to attach to modified arms of corner members (C.R. Laurence Square Lip Frame Plastic Corner) using bolts and nuts. Spacing of the plastic sheet from the window pane is approximately 0.75 inch. Lower corner U-Factors of about 0.20-0.23 were obtained for this mounting configuration versus 0.29 without any additional window covering on the window.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A supplemental window apparatus for improving the thermal insulating properties of an existing fenestration, comprising:
   a contiguous frame defining a perimeter area that substantially covers an entire existing window pane;
   a substantially non porous sheet material attached to said contiguous frame covering said perimeter area;
   an attachment mechanism operative to releasably attach said contiguous frame to said window pane and to set a distance between said window pane and said substantially non porous sheet material when said supplemental window apparatus is attached to the window pane;
   a seal in contact with said contiguous frame such that when said contiguous frame is attached to the window pane said seal is compressed against the window pane thereby trapping a volume of gas between said window pane and said substantially non porous sheet material;
   wherein said distance provides an optimum thickness of trapped gas for increasing thermal insulating properties of a transparent area of the fenestration which includes the existing window pane and said supplemental window; and
   wherein said attachment mechanism is located within said perimeter area.

2. The apparatus according to claim 1, wherein said attachment mechanism comprises a suction cup mechanism.

3. The apparatus according to claim 1, further comprising at least one of a plurality of slits and one or more notches in said seal adapted to follow contours of existing window muntins.

4. The apparatus according to claim 1, wherein said attachment mechanism comprises an adhesive mechanism.

5. The apparatus according to claim 4, wherein said adhesive mechanism comprises a dry adhesive mechanism.

6. The apparatus according to claim 1, wherein said attachment mechanism is substantially hidden from view from one side of the window pane.

7. The apparatus according to claim 1, wherein said optimum thickness is in a range of 0.15 to 0.75 inches.

8. The apparatus according to claim 1, wherein said seal comprises polymer foam or plastic sheet material whereby said seal compressibly changes dimensions in a plane perpendicular to the window pane.

9. The apparatus according to claim 1, wherein said seal comprises polymer foam or plastic sheet material whereby said seal compressibly changes dimensions in a plane parallel to the window pane.

10. The apparatus according to claim 1, wherein said seal comprises polymer foam or plastic sheet material adhered to said contiguous frame.

11. The apparatus according to claim 1, wherein said seal comprises polymer foam or plastic sheet material held in place via compression against said contiguous frame.

12. The apparatus according to claim 1, wherein said seal comprises substantially non porous sheet material.

13. The apparatus according to claim 1, wherein said substantially non porous sheet material is selected from the group comprising transparent substantially non porous sheet material, substantially non porous infrared reflective sheet material, substantially non porous low emissivity sheet material, semi-transparent substantially non porous sheet material, translucent substantially non porous sheet material and opaque substantially non porous sheet material.

14. The apparatus according to claim 1, wherein said supplemental window apparatus is adapted to be mounted to the interior portion of the window pane.

15. The apparatus according to claim 1, wherein said supplemental window apparatus is adapted to be mounted to the exterior portion of the window pane.

16. The apparatus according to claim 1, further comprising an infiltration blocking mechanism secured to said contiguous frame and operative to inhibit air infiltration at sealing interfaces of non-fixed window panes.

17. The apparatus according to claim 1, further comprising one or more parts secured to said contiguous frame and operative to enhance the aesthetics of said supplemental window apparatus.

18. The apparatus according to claim 1, further comprising a mechanism operative to inhibit air flow interior to the supplemental window apparatus.

19. The apparatus according to claim 1, wherein said attachment mechanism functions to set the distance between said window pane and said substantially non porous sheet material when said supplemental window apparatus is set in place on said window pane.

20. The apparatus according to claim 1, wherein said frame comprises a plurality of corner members operative to set the distance between said window pane and said substantially non porous sheet material when said supplemental window apparatus is set in place on said window pane.

21. A supplemental window apparatus for improving the thermal insulating properties of an existing fenestration, comprising:
a contiguous frame defining a perimeter area that substantially covers an entire existing window pane;
a substantially non porous sheet material attached to said contiguous frame covering said perimeter area;
an attachment mechanism operative to releasably attach said contiguous frame to a window sash or frame utilizing outward pressure against said window sash or frame;
a seal in contact with said contiguous frame such that when said contiguous frame is attached to the window sash or frame said seal is compressed against the window sash or frame thereby trapping a volume of gas between said window pane, said window sash or frame and said substantially non porous sheet material;
one or more spacers operative to set a distance between said window pane and said substantially non porous sheet material when said supplemental window apparatus is set held in place to said window sash or frame;
wherein said distance provides an optimum thickness of trapped gas for increasing thermal insulating properties of a transparent area of the fenestration which includes the existing window pane and said supplemental window; and
wherein said attachment mechanism is located within said perimeter area.

22. The apparatus according to claim 21, wherein said substantially non porous sheet material is selected from the group comprising transparent substantially non porous sheet material, substantially non porous infrared reflective sheet material, substantially non porous low emissivity sheet material, semi-transparent substantially non porous sheet material, translucent substantially non porous sheet material and opaque substantially non porous sheet material.

23. The apparatus according to claim 21, wherein said seal comprises polymer foam or plastic sheet material whereby said seal compressibly changes dimensions in a plane perpendicular to the window pane.

24. The apparatus according to claim 21, wherein said seal comprises polymer foam or plastic sheet material whereby said seal compressibly changes dimensions in a plane parallel to the window pane.

25. The apparatus according to claim 21, wherein said seal comprises polymer foam or plastic sheet material adhered to said contiguous frame.

26. The apparatus according to claim 21, wherein said seal comprises polymer foam or plastic sheet material held in place via compression against said contiguous frame.

27. A supplemental window apparatus for improving the thermal insulating properties of an existing fenestration, comprising:
a contiguous frame defining a perimeter area that substantially covers an entire existing window pane, said frame incorporating separate corner members that form the corners of said frame;
a substantially non porous sheet material attached to said contiguous frame covering said perimeter area;
an attachment mechanism affixed to said corner members and operative to releasably attach said contiguous frame to the window pane;
a compressible seal in contact with said contiguous frame such that when said contiguous frame is attached to the window pane said seal is compressed against the window pane thereby trapping a volume of gas between said window pane and said substantially non porous sheet material;

wherein said corner members and said attachment mechanism function to set a distance between said window pane and said substantially non porous sheet material when said supplemental window apparatus is attached to the window pane;

wherein said distance provides an optimum thickness of trapped gas for increasing thermal insulating properties of a transparent area of the fenestration which includes the existing window pane and said supplemental window; and wherein said attachment mechanism is located within said perimeter area.

28. The apparatus according to claim 27, wherein said distance is in a range of 0.15 to 0.75 inches.

29. A supplemental window apparatus for improving the thermal insulating properties of an existing fenestration, comprising:

a contiguous frame defining a perimeter area that substantially covers an entire existing window pane;

a substantially non porous sheet material attached to said contiguous frame covering said perimeter area;

a seal in contact with said contiguous frame such that when said contiguous frame is attached to the window sash or frame said seal is compressed against the window sash or frame thereby trapping a volume of gas between said window pane, said window sash or frame and said substantially non porous sheet material, said seal also operative to releasably attach said contiguous frame to a window sash or frame utilizing outward pressure against said window sash or frame;

one or more spacers operative to set a distance between said window pane and said substantially non porous sheet material when said supplemental window apparatus is set held in place to said window sash or frame;

wherein said distance provides an optimum thickness of trapped gas for increasing thermal insulating properties of a transparent area of the fenestration which includes the existing window pane and said supplemental window.

30. The apparatus according to claim 29, wherein said substantially non porous sheet material is selected from the group comprising transparent substantially non porous sheet material, substantially non porous infrared reflective sheet material, substantially non porous low emissivity sheet material, semi-transparent substantially non porous sheet material, translucent substantially non porous sheet material and opaque substantially non porous sheet material.

31. The apparatus according to claim 29, wherein said seal comprises polymer foam or plastic sheet material whereby said seal compressibly changes dimensions in a plane perpendicular to the window pane.

32. The apparatus according to claim 29, wherein said seal comprises polymer foam or plastic sheet material whereby said seal compressibly changes dimensions in a plane parallel to the window pane.

33. The apparatus according to claim 29, wherein said seal comprises polymer foam or plastic sheet material adhered to said contiguous frame.

34. The apparatus according to claim 29, wherein said seal comprises polymer foam or plastic sheet material held in place via compression against said contiguous frame.

* * * * *